United States Patent
Fujii et al.

(10) Patent No.: US 9,786,957 B2
(45) Date of Patent: Oct. 10, 2017

(54) ANODE AND BATTERY

(71) Applicant: Sony Corporation, Tokyo (JP)

(72) Inventors: Takayuki Fujii, Fukushima (JP);
Kenichi Kawase, Fukushima (JP);
Hideki Nakai, Fukushima (JP); Rikako Imoto, Fukushima (JP); Kensuke Yamamoto, Fukushima (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/244,824

(22) Filed: Aug. 23, 2016

(65) Prior Publication Data

US 2016/0365610 A1    Dec. 15, 2016

Related U.S. Application Data

(63) Continuation of application No. 14/176,288, filed on Feb. 10, 2014, now abandoned, which is a
(Continued)

(30) Foreign Application Priority Data

Oct. 15, 2007    (JP) .................................. 2007-268348

(51) Int. Cl.
*H01M 10/42* (2006.01)
*H01M 10/0525* (2010.01)
(Continued)

(52) U.S. Cl.
CPC ......... *H01M 10/4235* (2013.01); *H01M 4/02* (2013.01); *H01M 4/134* (2013.01);
(Continued)

(58) Field of Classification Search
CPC ........ H01M 4/134; H01M 4/02; H01M 4/366; H01M 4/62; H01M 10/42; H01M 10/4235;
(Continued)

(56) References Cited

U.S. PATENT DOCUMENTS

2009/0117472 A1*    5/2009    Iwamoto ............... H01M 4/131
429/246

FOREIGN PATENT DOCUMENTS

JP    07-220759    8/1995
JP    08-255641    1/1996
(Continued)

OTHER PUBLICATIONS

Japanese Office Action issued in connection with counterpart Japanese Patent Application No. 2007-268348 dated Jul. 24, 2012.
(Continued)

*Primary Examiner* — Karie O'Neill Apicella
(74) *Attorney, Agent, or Firm* — Dentons US LLP

(57) ABSTRACT

A battery including a cathode, an anode, and an electrolytic solution. The electrolytic solution is impregnated in a separator provided between the cathode and the anode. The anode has an insulative coat on an anode active material layer provided on an anode current collector. The coat contains an insulating material such as a meal hydroxide and a metal oxide. The coat is in a form of plate divided into a plurality of portions. The insulation property of the coat prevents internal short circuit. A plurality of portions of the coat prevent separation of the anode active material layer and decomposition of the electrolytic solution. Further, even when short circuit occurs, heat generation is prevented by heat absorption characteristics of the coat.

18 Claims, 12 Drawing Sheets

Related U.S. Application Data continuation of application No. 12/247,364, filed on Oct. 8, 2008, now Pat. No. 8,741,481.

(51) Int. Cl.
*H01M 4/62* (2006.01)
*H01M 4/36* (2006.01)
*H01M 4/02* (2006.01)
*H01M 4/38* (2006.01)
*H01M 4/134* (2010.01)
*H01M 4/48* (2010.01)

(52) U.S. Cl.
CPC ........... *H01M 4/366* (2013.01); *H01M 4/386* (2013.01); *H01M 4/62* (2013.01); *H01M 10/0525* (2013.01); *H01M 4/48* (2013.01); *H01M 2004/021* (2013.01); *H01M 2004/027* (2013.01); *H01M 2220/00* (2013.01); *Y02E 60/122* (2013.01)

(58) Field of Classification Search
CPC ...... H01M 10/0525; H01M 4/36; H01M 4/38; H01M 4/386
See application file for complete search history.

(56) References Cited

FOREIGN PATENT DOCUMENTS

| | | | |
|---|---|---|---|
| JP | 09-007637 | 1/1997 | |
| JP | 09-171813 | 6/1997 | |
| JP | 2002-042783 | 2/2002 | |
| JP | 2003-257419 | 9/2003 | |
| JP | 2004-171874 | 6/2004 | |
| JP | 2005-183179 | 7/2005 | |
| JP | 2005-322616 | 11/2005 | |
| JP | 2006-120604 | 5/2006 | |
| JP | 2006-302880 | 11/2006 | |
| JP | 2007-141666 | 6/2007 | |
| JP | 2007-086411 | 8/2007 | |
| JP | 2007-522619 | 8/2007 | |
| JP | WO 2007086411 A1 * | 8/2007 | ............ H01M 4/131 |
| WO | WO/2007/086411 A1 | 8/2007 | |

OTHER PUBLICATIONS

Japanese Office Action issued in connection with counterpart Japanese Patent Application No. 2007-268348 dated Jun. 25, 2013.

* cited by examiner

ANODE AND BATTERY

CROSS REFERENCES TO RELATED APPLICATIONS

This application is a continuation of U.S. patent application Ser. No. 14/176,288 filed Feb. 10, 2014 which is a continuation of U.S. patent application Ser. No. 12/247,364 filed Oct. 8, 2008, now U.S. Pat. No. 8,741,481 issued on Jun. 3, 2014, the entireties of which are incorporated herein by reference to the extent permitted by law. The present invention claims priority to and contains subject matter related to Japanese Patent Application JP 2007-268348 filed in the Japanese Patent Office on Oct. 15, 2007, the entire contents of which being incorporated herein by reference.

BACKGROUND OF THE INVENTION

1. Field of the Invention

The present invention relates to an anode having an anode active material layer on an anode current collector and a battery including the same.

2. Description of the Related Art

In recent years, portable electronic devices such as combination cameras (videotape recorder), mobile phones, and notebook personal computers have been widely used, and it is strongly demanded to reduce their size and weight and to achieve their long life. Accordingly, as a power source, a battery, in particular a light-weight secondary batter capable of providing a high energy density has been developed.

Specially, a secondary battery using insertion and extraction of lithium for charge and discharge reaction (so-called lithium ion secondary battery) is extremely prospective, since such a lithium ion secondary battery provides a higher energy density compared to a lead battery and a nickel cadmium battery. The lithium ion secondary battery includes a cathode and an anode that are opposed to each other with a separator in between and an electrolytic solution impregnated in the separator. The anode has an anode active material layer on an anode current collector.

As an anode active material contained in the anode active material layer, a carbon material such as graphite has been widely used. However, in recent years, as the high performance and the multi functions of the portable electronic devices are developed, improving the battery capacity is further demanded. Thus, it has been considered to use silicon or the like instead of the carbon material. Since the theoretical capacity of silicon (4199 mAh/g) is significantly higher than the theoretical capacity of graphite (372 mAh/g), it is prospected that the battery capacity is thereby significantly improved.

The lithium ion secondary battery provides a high energy density. Meanwhile, the lithium ion secondary battery has some disadvantages that should be solved. Firstly, when charged, the anode active material inserting lithium is highly active. Thus, the electrolytic solution tends to be easily decomposed and lithium tends to be inactivated. Secondly, when the separator is broken by strong external force, internal short circuit may be generated. Thirdly, when the anode active material is swollen and shrunk during charge and discharge, the anode active material layer may be separated. All the foregoing disadvantages may become a cause to lower the cycle characteristics and the safety.

To solve the various disadvantages of the lithium ion secondary battery, various techniques have been considered. Specifically, to improve the cycle characteristics and the load characteristics, a technique of coating the surface of carbon particles as an anode active material with a hydrate of aluminum oxide by dipping method has been proposed (for example, refer to Japanese Unexamined Patent Application Publication No. 2003-257419). Further, to prevent abnormal overheat due to internal short circuit, a technique of forming a porous insulating layer such as alumina on the surface of the anode active material layer by vapor-phase deposition method such as sputtering method has been proposed (for example, refer to Japanese Unexamined Patent Application Publication No. 2005-183179). Furthermore, to prevent internal short circuit due to overheat, a technique of forming a porous heat-resistant layer containing an insulative filler such as alumina and a binder between the separator and the anode active material layer by coating method has been proposed (for example, refer to Japanese Unexamined Patent Application Publication No. 2006-120604). Moreover, to prevent internal short circuit, a technique of forming a porous protective film composed of solid particles such as alumina powder and a resin binder on the surface of the anode active material layer by coating method has been proposed (for example, refer to Japanese Unexamined Patent Application Publication No. 07-220759). Moreover, to improve the capacity characteristics and the cycle characteristics, a technique of covering the surface of the anode active material with an inorganic ion conductive film composed of lithium-aluminum hydroxide compound by dipping method has been proposed (for example, refer to Japanese Unexamined Patent Application Publication No. 09-171813). Moreover, to improve the cycle characteristics, a technique of covering a partial surface of the anode active material with a metal oxide by liquid-phase deposition method has been proposed (for example, refer to Japanese Unexamined Patent Application Publication No. 2007-141666).

SUMMARY OF THE INVENTION

In recent years, in the portable electronic devices, the high performance and the multi functions tend to be increasingly developed and thus, electric power consumption thereof tends be increased. Accordingly, there is a tendency that charge and discharge of the secondary battery used for the portable electronic devices are frequently repeated, and thus the cycle characteristics and the safety are easily lowered. Therefore, further improvement of the cycle characteristics and the safety of the secondary battery is aspired.

In view of the foregoing, in the invention, it is desirable to provide an anode and a battery capable of obtaining superior cycle characteristics and safety.

According to an embodiment of the invention, there is provided an anode having an insulative coat divided into a plurality of portions on an anode active material layer provided on an anode current collector. According to an embodiment of the invention, there is provided a battery including a cathode, an anode, and an electrolytic solution, in which the anode has an insulative coat divided into a plurality of portions on an anode active material layer provided on an anode current collector.

According to the anode of the embodiment of the invention, the anode has the insulative coat divided into a plurality of portions on the anode active material layer. Therefore, in the case where the anode is used for an electrochemical device such as a battery, the insulation property of the coat prevents internal short circuit, and the plurality of portions of the coat prevent separation of the anode active material layer and decomposition of the electrolytic solution. Further, even when short circuit occurs, heat generation is prevented by heat absorption characteristics of the coat. Thereby, according to the battery including the anode of the invention, superior cycle characteristics and safety are obtained.

Other and further objects, features and advantages of the invention will appear more fully from the following description.

DETAILED DESCRIPTION OF THE PREFERRED EMBODIMENT

An embodiment of the invention will be hereinafter described in detail with reference to the drawings.

Figure 1:
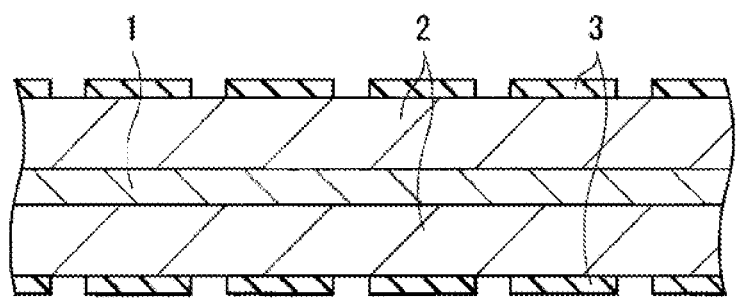
FIG. 1 is a cross section view showing a structure of an anode according to an embodiment of the invention.

FIG. 1 schematically shows a cross sectional structure of an anode according to an embodiment of the invention. The anode is used, for example, for an electrochemical device such as a battery. The anode has an anode current collector 1 having a pair of opposed faces, an anode active material layer 2 provided on the anode current collector 1, and a coat 3 provided on the anode active material layer 2. The anode active material layer 2 and the coat 3 may be provided on the both faces of the anode current collector 1 or on only a single face thereof.

The anode current collector 1 is preferably made of a metal material having favorable electrochemical stability, favorable electric conductivity, and favorable mechanical strength. As such a kind of metal material, for example, copper (Co), nickel (Ni), stainless or the like is cited. Among them, copper is preferable since high electric conductivity is thereby obtained.

In particular, the foregoing metal material preferably contains one or more metal elements not forming an intermetallic compound with an electrode reactant. If the intermetallic compound is formed with the electrode reactant, lowering of the current collectivity characteristics and separation of the anode active material layer 2 from the anode current collector 1 may occur, because it is easily affected by stress due to expansion and shrinkage of the anode active material layer 2 during the operation of the electrochemical device (for example, during charge and discharge of battery). As such a kind of metal element, for example, copper, nickel, titanium, iron (Fe), chromium (Cr) or the like is cited.

The foregoing metal material preferably contains one or more metal elements being alloyed with the anode active material layer 2. Thereby, the contact characteristics between the anode current collector 1 and the anode active material layer 2 are improved, and thus the anode active material layer 2 is less likely to be separated from the anode current collector 1. As a metal element that does not form an intermetallic compound with the electrode reactant and is alloyed with the anode active material layer 2, for example, in the case where the anode active material layer 2 contains silicon as an anode active material, copper, nickel, iron or the like is cited. These metal elements are preferable in terms of the strength and the electric conductivity as well.

The anode current collector 1 may have a single layer structure or a multilayer structure. In the case where the anode current collector 1 has the multilayer structure, for example, it is preferable that the layer adjacent to the anode active material layer 2 is made of a metal material being alloyed with the anode active material layer 2, and layers not adjacent to the anode active material layer 2 are made of other metal material.

The surface of the anode current collector 1 is preferably roughened. Thereby, due to so-called anchor effect, the contact characteristics between the anode current collector 1 and the anode active material layer 2 are improved. In this case, it is enough that at least the surface of the anode current collector 1 opposed to the anode active material layer 2 is roughened. As a roughening method, for example, a method of forming fine particles by electrolytic treatment and the like are used. The electrolytic treatment is a method of providing concavity and convexity by forming fine particles on the surface of the anode current collector 1 by electrolytic method in an electrolytic bath. A copper foil provided with the electrolytic treatment is generally called "electrolytic copper foil."

The anode active material layer 2 contains one or more anode materials capable of inserting and extracting an electrode reactant as an anode active material. The anode active material layer 2 may also contain other materials such as a conductive agent and a binder according to needs.

As the anode material capable of inserting and extracting the electrode reactant, for example, a material that is able to insert and extract the electrode reactant and contains at least one of metal elements and metalloid elements as an element is cited. Such an anode material is preferably used, since a high energy density is thereby obtained. Such a kind of anode material may be a simple substance, an alloy, or a compound of a metal element or a metalloid element, or may have one or more phases thereof at least in part.

In the invention, "the alloy" includes an alloy containing one or more metal elements and one or more metalloid elements, in addition to an alloy composed of two or more metal elements. Further, "the alloy" may contain a nonmetallic element. The texture thereof includes a solid solution, a eutectic crystal (eutectic mixture), an intermetallic compound, and a texture in which two or more thereof coexist.

As the foregoing metal element or the foregoing metalloid element, for example, a metal element or a metalloid element capable of forming an alloy with the electrode reactant is cited. Specifically, magnesium (Mg), boron (B), aluminum, gallium (Ga), indium (In), silicon, germanium (Ge), tin (Sn), lead (Pb), bismuth (Bi), cadmium (Cd), silver (Ag), zinc (Zn), hafnium (Hf), zirconium, yttrium (Y), palladium (Pd), platinum (Pt) and the like are cited. Specially, at least one of silicon and tin is preferably used, and silicon is preferable to tin, because silicon has the high ability to insert and extract the electrode reactant, and provides a high energy density.

As an anode material containing at least one of silicon and tin, for example, the simple substance, an alloy, or a compound of silicon; the simple substance, an alloy, or a compound of tin; or a material having one or more phases thereof at least in part is cited. Each thereof may be used singly, or a plurality thereof may be used by mixture.

As the alloy of silicon, for example, an alloy containing at least one selected from the group consisting of tin, nickel, copper, iron, cobalt, manganese, zinc, indium, silver, titanium, germanium, bismuth, antimony, and chromium as the second element other than silicon is cited. As the compound of silicon, for example, a compound containing oxygen or carbon (C) is cited, and the compound of silicon may contain the foregoing second element in addition to silicon. Examples of an alloy or a compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), $SnO_w$ ($0<w\leq2$), LiSiO and the like.

As the alloy of tin, for example, an alloy containing at least one selected from the group consisting of silicon, nickel, copper, iron, cobalt, manganese, zinc, indium, silver, titanium, germanium, bismuth, antimony, and chromium as the second element other than tin is cited. As the compound of tin, for example, a compound containing oxygen or carbon is cited, and may contain the foregoing second element in addition to tin. Examples of an alloy or a compound of tin include $SnSiO_3$, $LiSnO$, $Mg_2Sn$ and the like.

In particular, as the anode material containing at least one of silicon and tin, for example, an anode material containing the second element and the third element in addition to tin as the first element is preferable. As the second element, at least one selected from the group consisting of cobalt, iron, magnesium, titanium, vanadium (V), chromium, manganese, nickel, copper, zinc, gallium, zirconium, niobium (Nb), molybdenum, silver, indium, cerium (Ce), hafnium, tantalum (Ta), tungsten (W), bismuth, and silicon is cited. As the third element, at least one selected from the group consisting of boron, carbon, aluminum, and phosphorus (P) is cited. When the second element and the third element are contained, the cycle characteristics are improved.

Specially, a SnCoC-containing material that contains tin, cobalt, and carbon as an element in which the carbon content is in the range from 9.9 wt % to 29.7 wt %, and the cobalt ratio to the total of tin and cobalt (Co/(Sn+Co)) is in the range from 30 wt % to 70 wt % is preferable. In such a composition range, a high energy density is obtained.

The SnCoC-containing material may further contain other element according to needs. As other element, for example, silicon, iron, nickel, chromium, indium, niobium, germanium, titanium, molybdenum, aluminum, phosphorus, gallium, bismuth or the like is preferable. Two or more thereof may be contained, since thereby higher effects are obtained.

The SnCoC-containing material has a phase containing tin, cobalt, and carbon. Such a phase preferably has a low crystallinity structure or an amorphous structure. Further, in the SnCoC-containing material, at least part of carbon as an element is preferably bonded to a metal element or a metalloid element as other element. Cohesion or crystallization of tin or the like is thereby inhibited.

The SnCoC-containing material may be formed by, for example, mixing raw materials of each element, dissolving the resultant mixture in an electric furnace, a high frequency induction furnace, an arc melting furnace or the like and then solidifying the resultant. Otherwise, the SnCoC-containing material may be formed by various atomization methods such as gas atomizing and water atomizing; various roll methods; or a method using mechanochemical reaction such as mechanical alloying method and mechanical milling method. Specially, the SnCoC-containing material is preferably formed by the method using mechanochemical reaction, since thereby the anode active material is able to have a low crystalline structure or an amorphous structure. For the method using the mechanochemical reaction, for example, a manufacturing apparatus such as a planetary ball mill and an attliter may be used.

As a measurement method for examining bonding state of elements, for example, X-ray Photoelectron Spectroscopy (XPS) may be used. In XPS, in the case of graphite, the peak of is orbit of carbon (C1s) is observed at 284.5 eV in the apparatus in which energy calibration is made so that the peak of 4f orbit of gold atom (Au4f) is obtained in 84.0 eV. In the case of surface contamination carbon, the peak is observed at 284.8 eV. Meanwhile, in the case of higher electric charge density of carbon element, for example, when carbon is bonded to a metal element or a metalloid element, the peak of C1s is observed in the region lower than 284.5 eV. That is, when the peak of the composite wave of C1s obtained for the SnCoC-containing material is observed in the region lower than 284.5 eV, at least part of carbon contained in the SnCoC-containing material is bonded to the metal element or the metalloid element as other element.

In XPS, for example, the peak of C1s is used for correcting the energy axis of spectrums. Since surface contamination carbon generally exists on the surface, the peak of C1s of the surface contamination carbon is set to in 284.8 eV, which is used as an energy reference. In XPS, the waveform of the peak of C1s is obtained as a form including the peak of the surface contamination carbon and the peak of carbon in the SnCoC-containing material. Therefore, for example, by analyzing the waveform with the use of commercially available software, the peak of the surface contamination carbon and the peak of carbon in the SnCoC-containing material are separated. In the analysis of the waveform, the position of the main peak existing on the lowest bound energy side is set to the energy reference (284.8 eV).

The anode active material layer 2 using the simple substance, an alloy, or a compound of silicon; the simple substance, an alloy, or a compound of tin; or a material having one or more phases thereof at least in part as an anode material is preferably formed by, for example, vapor-phase deposition method, liquid-phase deposition method, spraying method, coating method, firing method, or a combination of two or more of these methods. In this case, the anode current collector 1 and the anode active material layer 2 are preferably alloyed in at least part of the interface thereof. Specifically, at the interface thereof, the element of the anode current collector 1 may be diffused in the anode active material layer 2; or the element of the anode active material layer 2 may be diffused in the anode current collector 1; or these elements may be diffused in each other. Thereby, destruction due to expansion and shrinkage of the anode active material layer 2 in charge and discharge is prevented, and the electron conductivity between the anode current collector 1 and the anode active material layer 2 is improved.

As vapor-phase deposition method, for example, physical deposition method or chemical deposition method is cited. Specifically, vacuum evaporation method, sputtering method, ion plating method, laser ablation method, thermal CVD (Chemical Vapor Deposition) method, plasma CVD method and the like are cited. As liquid-phase deposition method, a known technique such as electrolytic plating and electroless plating is used. Coating method is, for example, a method in which a particulate anode active material mixed with a binder or the like is dispersed in a solvent and the anode current collector is coated with the resultant. Firing method is, for example, a method in which coating is provided by coating method and then heat treatment is provided at a temperature higher than the melting point of the binder or the like. For firing method, a known technique such as atmosphere firing method, reactive firing method, and hot press firing method is available as well.

In addition to the foregoing anode material, as the anode material capable of inserting and extracting the electrode reactant, for example, a carbon material is cited. As the carbon material, for example, graphitizable carbon, non-graphitizable carbon in which the spacing of (002) plane is 0.37 nm or more, graphite in which the spacing of (002) plane is 0.34 nm or less and the like are cited. More specifically, pyrolytic carbons, coke, glassy carbon fiber, an organic polymer compound fired body, activated carbon, carbon black or the like is cited. The coke includes pitch coke, needle coke, petroleum coke and the like. The organic polymer compound fired body is obtained by firing and carbonizing a phenol resin, a furan resin or the like at an appropriate temperature. In the carbon material, the crystal structure change associated with inserting and extracting the electrode reactant is very small. Therefore, for example, by using the carbon material together with other anode material, a high energy density is obtained together with superior cycle characteristics. In addition, the carbon material also functions as an electrical conductor, and thus the carbon material is preferably used. The shape of the carbon material may be any of a fibrous shape, a spherical shape, a granular shape, and a scale-like shape.

Further, as the anode material capable of inserting and extracting the electrode reactant, for example, a metal oxide, a polymer compound and the like capable of inserting and extracting the electrode reactant are cited. As the metal oxide, for example, iron oxide, ruthenium oxide, molybdenum oxide or the like is cited. As the polymer compound, for example, polyacetylene, polyaniline, polypyrrole or the like is cited.

It is needless to say that these anode materials may be used together with the above-mentioned anode material. Further, a mixture of two or more of anode materials may be used in any combination.

As the electrical conductor, for example, a carbon material such as graphite, carbon black, acetylene black, and Ketjen black is cited. Such a carbon material may be used singly, or a plurality thereof may be used by mixture. The electrical conductor may be a metal material, a conductive polymer or the like as long as the material has the electric conductivity.

As the binder, for example, a synthetic rubber such as styrene-butadiene rubber, fluorinated rubber, and ethylenepropylenediene; or a polymer material such as polyvinylidene fluoride is cited. One thereof may be used singly, or two or more thereof may be used by mixture.

Figure 2:
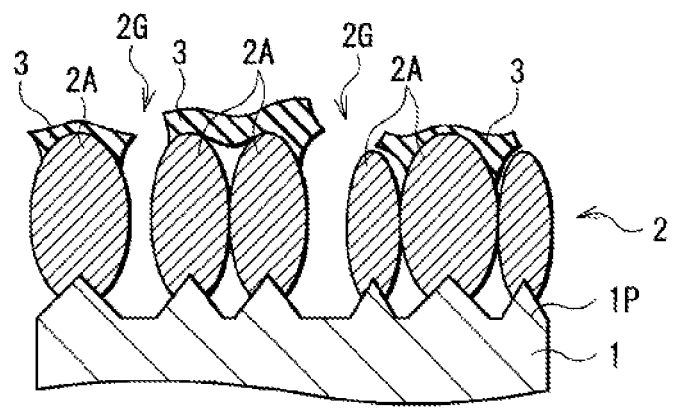
FIG. 2 is a cross section view showing an enlarged part of the anode shown in FIG. 1.
Figure 3:
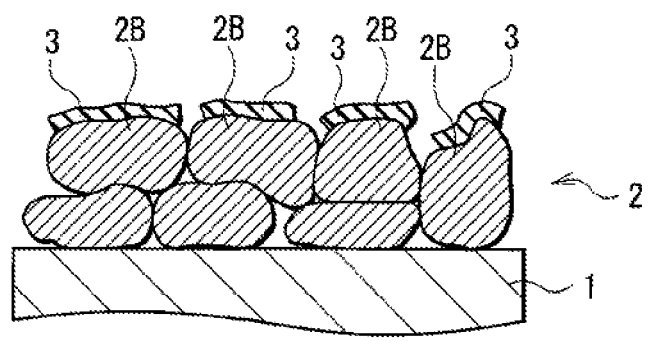
FIG. 3 is another cross section view showing an enlarged part of the anode shown in FIG. 1.

FIG. 2 and FIG. 3 show an enlarged part of the anode shown in FIG. 1. The anode active material layer 2 has several modes according to the type of the anode active material and the method of forming the anode active material layer 2.

Specifically, for example, in the case where the anode active material contains a material that is capable of inserting and extracting the electrode reactant and that contains at least one of metal elements and metalloid elements, and the anode active material is formed by vapor-phase deposition method or the like, as shown in FIG. 2, the anode active material layer 2 contains a plurality of particulate anode active materials (anode active material particles 2A) extending in the vertical direction (in a direction away from the surface of the anode current collector 1). In the case where the anode current collector 1 is made of a roughened foil such as an electrolytic copper foil and a plurality of projection sections 1P exist on the surface thereof, the anode active material particle 2A is grown for every projection 1P in the thickness direction, and is linked to the anode current collector 1 at the root. The plurality of anode active material particles 2A may be adjacent to each other, or may be spaced from each other at intervals (gap 2G). In the case where the anode active material is deposited on the anode current collector 1 by vapor-phase deposition method or the like, the anode active material particles 2A may have a single layer structure formed by one deposition step, or may have multilayer structure formed by a plurality of deposition steps. In this case, it is preferable that the anode active material is deposited by vapor-phase deposition method, and at lest part of the interface between the anode current collector 1 and the anode active material particles 2A is alloyed.

Further, for example, when the anode active material contains the carbon material, as shown in FIG. 3, the anode active material layer 2 contains a plurality of anode active material particles 2B. The anode active material particles 2B are carbon material particles. Two or more of carbon material particles may aggregate to form the anode active material particle 2B in some cases. In the case where the carbon material is used as an anode active material, the anode active material is generally mixed with a binder or the like. However, in FIG. 3, the binder or the like is not shown. If the binder is shown in FIG. 3, the binder should exist in a gap between each anode active material particle 2B. In FIG. 3, the projection section 1P shown in FIG. 2 is not shown. However, in the case shown in FIG. 3, the anode current collector 1 may have the projection section 1P.

The coat 3 contains an insulating material, and is divided into a plurality of portions. The divided insulative coat 3 is provided on the anode active material layer 2 for the following reasons. Firstly, the insulation property of the coat 3 prevents internal short circuit of an electrochemical device. Secondly, since part of the anode active material layer 2 is covered with the coat 3, the anode active material layer 2 is prevented from being separated while securing a migration path of the electrode reactant (insertion and extraction path). Thirdly, the heat absorption characteristics of the coat 3 prevents heat generation when an electrochemical device is short-circuited.

As shown in FIG. 2 and FIG. 3, the divided coat 3 has a plate shape (so-called plate-like). While the coat 3 extends along a partial surface of the anode active material particle 2A or 2B, the coat 3 covers the partial surface. "The coat 3 has a plate shape" means that the coat 3 is in a state of a mass made of an insulating material, and is not in a state of a particle. That is, the coat 3 is not a complex system containing an insulating material particle, a binder or the like.

In some cases, each coat 3 exists on one anode active material particle 2A or 2B, extends along a partial surface thereof while covering the partial surface. In some cases, each coat 3 extends and lies on two or more anode active material particles 2A or 2B, extends along a partial surface thereof while continuously covering the partial surface. For the covering state, the latter is preferable to the former, and a case of including the both covering states is preferable to a case of including only one covering state. This is because the separation of the anode active material layer 2 is further prevented. Accordingly, in the case where the both covering states are included, a larger ratio of the latter covering state is preferable. FIG. 2 shows the former and the latter covering states, and FIG. 3 shows only the former covering state. It is needless to say that the latter covering state may be included in the case shown in FIG. 3.

The type of the insulating material composing the coat 3 is not particularly limited, but an insulating material having a high heat capacity is preferable to improve heat absorption characteristics. For example, an insulating material which has heat resistance (decomposition temperature) of 500 deg C. or more, and in which the volume heat capacity (specific heat) at 300 K is 1.7 J/K·g or more is preferable.

Specifically, the coat 3 preferably contains at least one of a metal hydroxide and a metal oxide, since such a compound has a high heat capacity and a high specific heat and thus the heat absorption ability is improved. Between them, the metal hydroxide is preferable. Although the metal hydroxide and the metal oxide are finally decomposed by being heated, the metal oxide is directly decomposed, whereas the metal hydroxide is changed to a metal oxide and then decomposed. Thus, the heat absorption ability in the case of using the metal hydroxide is higher than that in the case of using the metal oxide. As the foregoing metal hydroxide, for example, at least one selected from the group consisting of aluminum hydroxide, zirconium hydroxide, and a substitute hydroxide is cited. As the metal oxide, for example, at least one selected from the group consisting of aluminum oxide, zirconium oxide, and titanium oxide is cited. It is needless to say that a metal hydroxide and a metal oxide other than the foregoing metal hydroxides and the foregoing metal oxides may be used.

The method of forming the coat 3 is not particularly limited. However, a method capable of collectively forming the coat 3 that is divided into a plurality of portions is preferable. As such a kind of forming method, for example, electrolytic plating method or electroless plating method is cited. Specially, the electrolytic plating method is preferable, since thereby the divided coat 3 is able to be easily formed on the anode active material layer 2 by one step under general plating conditions. However, forming methods other than the foregoing forming methods may be used.

In the case where the coat 3 is formed by electrolytic plating method, as shown in FIG. 2, the growth process of the plating film is affected by so-called edge effect. Thus, the thickness of the coat 3 in the end portion tends to be relatively thick, and t in the central portion thereof tends to be relatively thin. In some cases, the end portion of the coat 3 is grown from the surface of the anode active material particle 2A adjacent to the anode active material particle 2A covered with the end portion of the coat 3 with a distance, while extending the surface thereof. Such a mode is one of the characteristics caused when the coat 3 divided into a plurality of portions is formed by electrolytic plating method. It is needless to say that the foregoing mode may be caused in the case shown in FIG. 3 as well.

Whether or not the coat 3 is formed by electrolytic plating method may be checked after the fact. In the case where the coat 3 is formed by using a plating solution containing a nitrate salt, nitrogen component should remain in the coat 3. The nitrate salt is, for example, aluminum nitrate nonahydrate ($Al(NO_3)_3 \cdot 9H_2O$) or the like in the case of using aluminum hydroxide as a material of the coat 3. In the case where the coat 3 is formed by coating method, vapor-phase deposition method or the like, nitrogen component should not remain in the coat 3 unless the coat 3 is formed by using an insulating material containing nitrogen as an element. A fact that the coat 3 contains the nitrogen component is a supporting evidence that the coat 3 is formed by electrolytic plating method. The amount of the nitrogen component remaining in the coat 3 is about in the range from 0.5% to 3% at an atomic ratio in the case of using the foregoing plating solution containing a nitrate salt, and is able to be confirmed by element analysis by XPS, for example.

In particular, where the area of the anode active material layer 2 is S1 and the area of the coat 3 is S2, the area ratio S2/S1 is preferably in the range from 0.2 to 0.9. Thereby, the foregoing function of the coat 3 is sufficiently demonstrated. More specifically, if the area ratio S2/S1 is smaller than 0.2, the covering range of the coat 3 is extremely small and thus it may be difficult to prevent the separation of the anode active material layer 2. Meanwhile, if the area ratio S2/S1 is larger than 0.9, the formation range of the coat 3 is extremely large and thus it is difficult to insert and extract the electrode reactant.

The foregoing areas S1 and S2 may be calculated by observing the surface of the anode by a Scanning Electron Microscope (SEM)-Energy Dispersive X-ray spectrometer (EDX) or the like, defining a given formation range of the anode active material layer 2 (area S1) as a reference, and then determining the formation range of the coat 3 (area S2) in the foregoing range. In this case, the areas S1 and S2 may be artificially calculated, but the areas S1 and S2 are preferably calculated mechanically by image-editing software or the like, since thereby high measurement precision is obtained and the reproducibility of the measurement numerical value becomes high.

Further, the weight per unit area of the coat 3 is preferably in the range from 0.02 $mg/cm^2$ to 1 $mg/cm^2$, since thereby the foregoing function of the coat 3 is sufficiently demonstrated. More specifically, if the weight per unit area is smaller than 0.02 $mg/cm^2$ or larger than 1 $mg/cm^2$, as in the case described for the area ratio S2/S1, it is difficult to prevent the separation of the anode active material layer 2, and to insert and extract the electrode reactant.

The foregoing weight per unit area of the coat 3 may be also calculated by examining a weight difference of the anode between the weight before forming the coat 3 and the weight after forming the coat 3.

The anode is formed, for example, by the following procedure.

First, the anode current collector 1 made of an electrolytic copper foil or the like is prepared. After that, the anode active material layer 2 is formed on the anode current collector 1 by selecting the forming method according to the type of the anode active material or the like. Specifically, in the case where a material that is capable of inserting and extracting the electrode reactant and that contains at least one of metal elements and metalloid elements is used as an anode active material, the anode active material is deposited on the anode current collector 1 by vapor-phase deposition method or the like to form the plurality of anode active material particles 2A to form the anode active material layer 2. Further, in the case where the carbon material is used as an anode active material, the anode current collector 1 is coated with a slurry containing the particulate anode active material (anode active material particles 2B) by coating method or the like, the resultant is dried and compression-molded according to needs to form the anode active material layer 2. Finally, the coat 3 is formed on the anode active material layer 2 by electrolytic plating method or the like. When the insulating material such as the metal hydroxide and the metal oxide is plated and grown after the anode active material layer 2 is formed, the plating film is not grown to fill in the gap between the anode active material particles 2A or 2B, but is grown to locally cover the top portion thereof. Thus, the coat 3 is formed and divided into a plurality of portions. Accordingly, the anode is formed.

With this anode, since the insulative coat 3 divided into a plurality of portions is provided on the anode active material layer 2, in the case where the anode is used for an electrochemical device, superior cycle characteristics and safety are able to be obtained for the following reasons.

Figure 4:
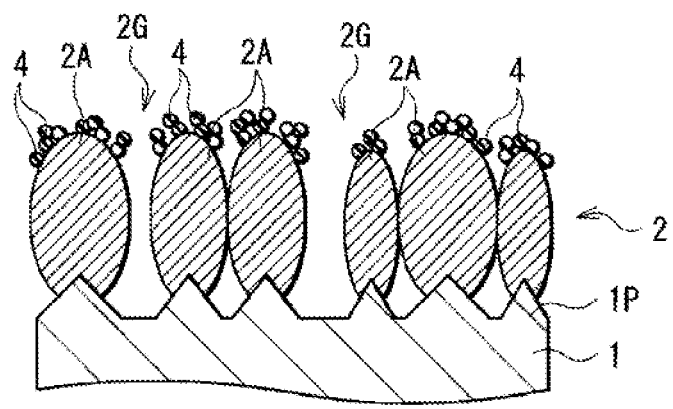
FIG. 4 is a cross section view showing a structure of an anode of a comparative example.
Figure 5:
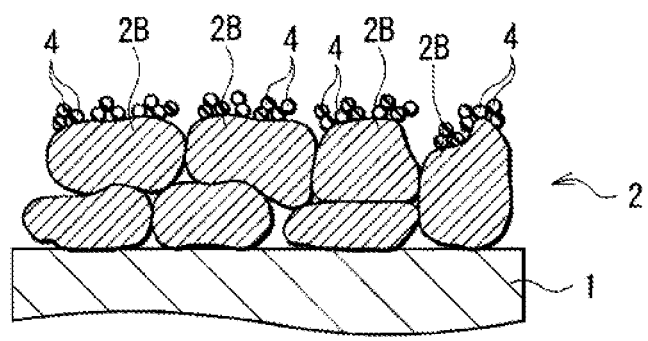
FIG. 5 is another cross section view showing a structure of the anode of the comparative example.

FIG. 4 and FIG. 5 show a cross sectional structure of an anode of a comparative example, and respectively correspond to FIG. 2 and FIG. 3. In the anode of the comparative example, the surface of the anode active material layer 2 is coated with a slurry containing insulating material particles and a binder by coating method, and thereby a coat 4 in a state of a plurality of particles is formed on the anode active material layer 2. In the anode of this embodiment, the following advantages are obtained compared to the anode of the comparative example.

Firstly, since the insulative coat 3 is in a state of a plate divided into a plurality of portions, the anode active material particle 2A or 2B is insulated from outside more than the case that the insulative coat 4 is in a state of a particle. The plate-like coat 3 not generating a gap in the covering range allows the anode active material particle 2A or 2B to be insulated from outside over a large range. Meanwhile, the particulate coat 4 that is dotted locally and generates a number of gaps in the covering range insulates the anode active material particle 2A or 2B only in a small range. Thereby, since the anode is less likely to be conducted to the outside due to the insulation property of the coat 3, internal short circuit of the electrochemical device is prevented.

Secondly, the plate-like coat 3 covers the anode active material particle 2A or 2B, and thus physical pressure force applied by the coat 3 to the anode active material particle 2A or 2B is larger than in the case that the particulate coat 4 covers the anode active material particle 2A or 2B. The plate-like coat 3 is able to press the anode active material particle 2A or 2B over a large range. Meanwhile, the particulate coat 4 is able to press the anode active material particle 2A or 2B only in a small range. Thereby, the anode active material layer 2 is less likely to be expanded and shrunk when charged and discharged. Therefore, the anode active material layer 2 is prevented from being separated in the place where the anode active material layer 2 is covered while securing a migration path of the electrode reactant (insertion and extraction path) in the place where the anode active material layer 2 is not covered. In this case, when the anode is used together with an electrolytic solution for an electrochemical device, the coat 3 works as a protective film for the anode active material layer 2 and thus decomposition reaction of the electrolytic solution is also prevented.

Thirdly, since the plate-like coat 3 has heat absorption characteristics, the heat absorption ability is higher than in the case that the particulate coat 4 has heat absorption characteristics. Since the plate-like coat 3 has a larger volume than the particulate coat 4, the heat absorption amount thereof is also larger than that of the particulate coat 4. Thereby, even when the electrochemical device is short-circuited, heat generation is inhibited by the heat absorption characteristics of the coat 3.

Accordingly, in the anode of this embodiment, internal short circuit in the electrochemical device is prevented, and separation of the anode active material layer, decomposition of the electrolytic solution, and heat generation when short-circuited are prevented. As a result, superior cycle characteristics and safety are obtained.

In particular, when the coat 3 contains the metal hydroxide or the metal oxide, favorable insulation property and favorable heat absorption characteristics are obtained in the coat 3, and thus high effects are obtained.

Further, in the case where the anode active material layer 2 contains the plurality of anode active material particles 2A or 2B, when the coat 3 extends along a partial surface of two or more anode active material particles 2A or 2B, while continuously covering the partial surface, the anode active material layer 2 is more less likely to be separated in the place where the anode active material layer 2 is covered and thus higher effects are able to be obtained.

Further, when the area ratio S2/S1 is in the range from 0.2 to 0.9, or when the weight per unit area of the coat 3 is in the range from 0.02 mg/cm$^2$ to 1 mg/cm$^2$, higher effects are able to be obtained.

Further, when the coat 3 is formed by electrolytic plating method, the coat 3 divided into a plurality of portions is able to be easily formed on the anode active material layer 2 by one step.

In addition, when the anode active material layer 2 contains silicon, the anode active material layer 2 is expanded and shrunk and is easily separated in electrode reaction. However, in the anode of this embodiment, such separation of the anode active material layer 2 is effectively prevented, and thus higher effects are able to be obtained.

Next, a description will be hereinafter given of a usage example of the foregoing anode. As an example of the electrochemical devices, batteries are herein taken. The anode is used for the batteries as follows.

First Battery

Figure 6:
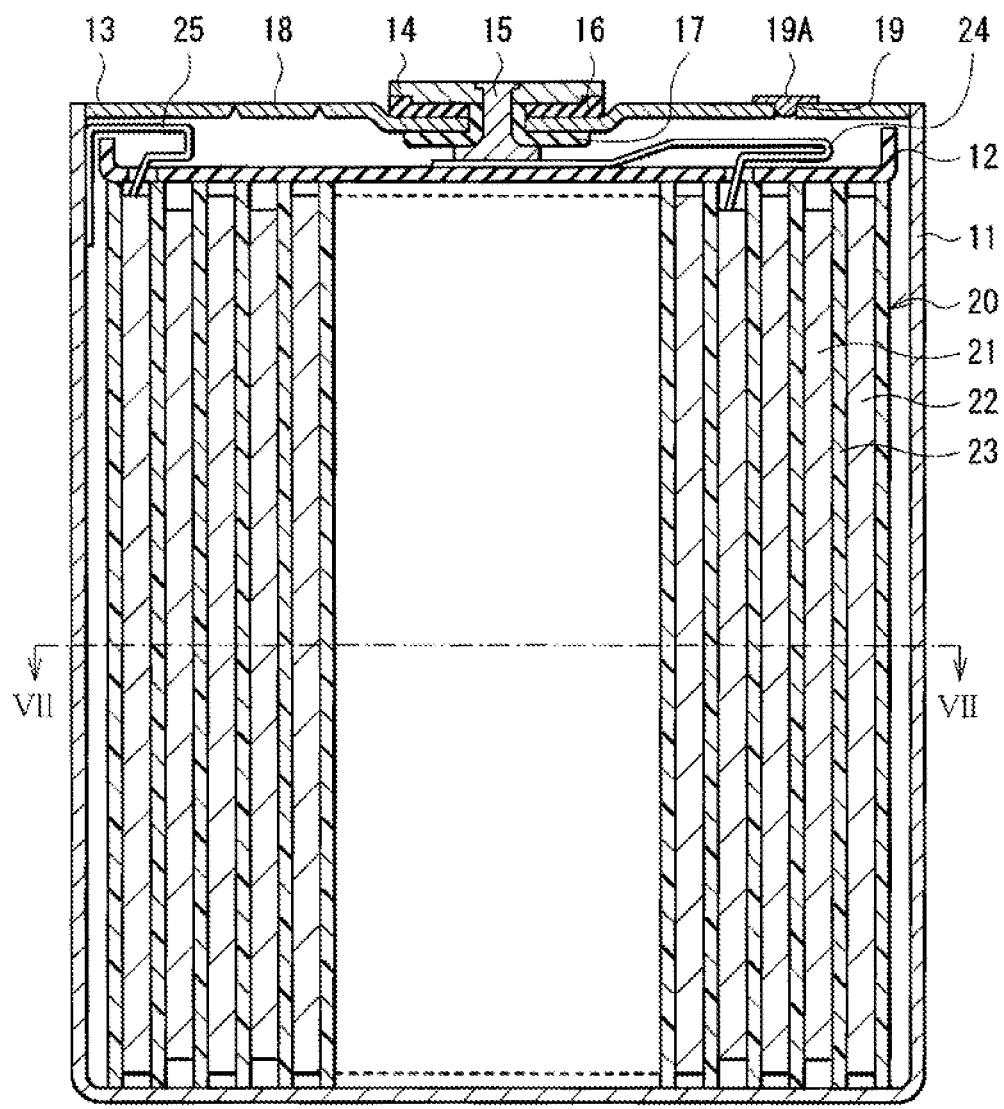
FIG. 6 is a cross section view showing a structure of a first battery including the anode according to the embodiment of the invention.
Figure 7:
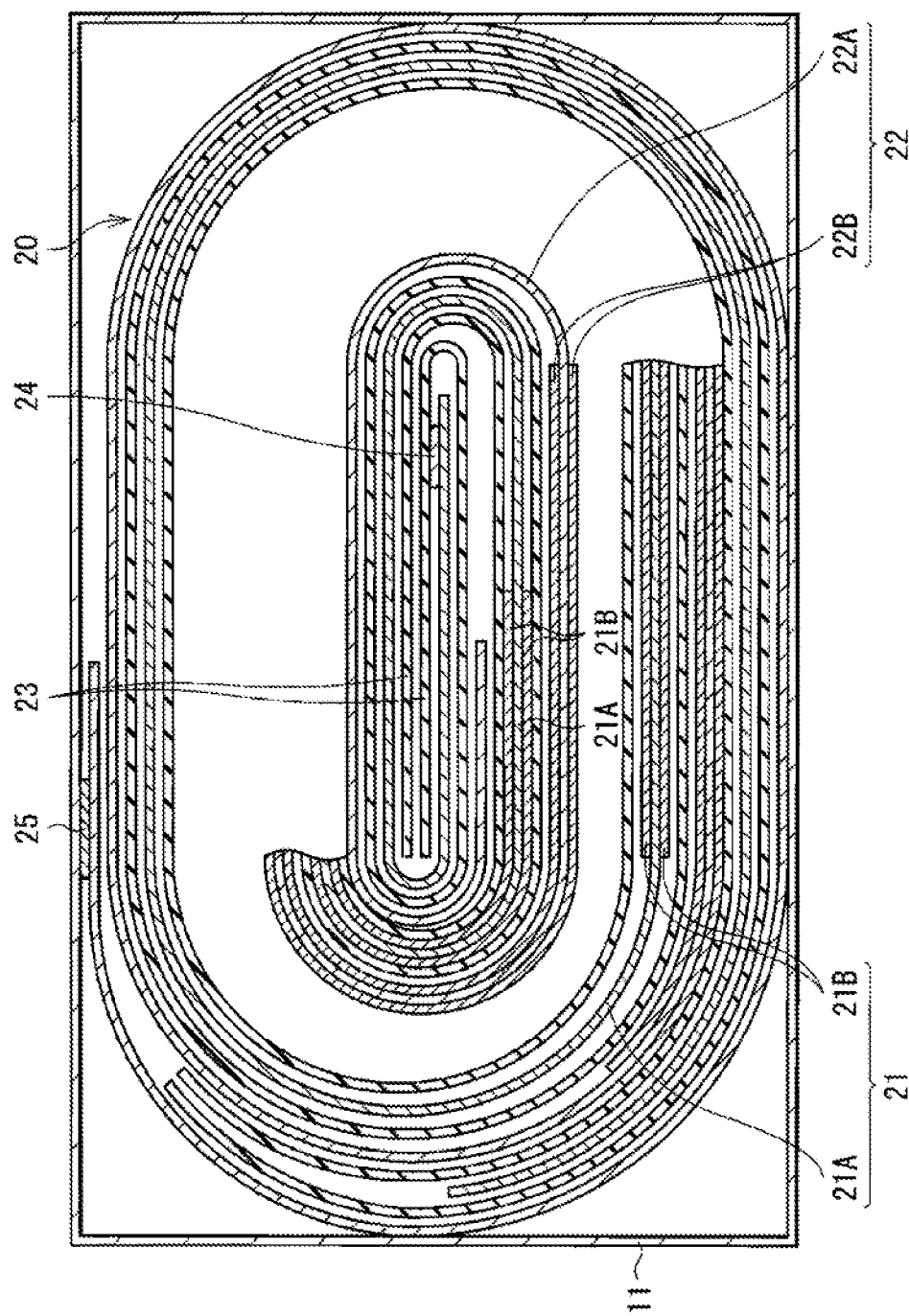
FIG. 7 is a cross section view taken along line VII-VII of the first battery shown in FIG. 6.

FIG. 6 and FIG. 7 show cross sectional structures of a first battery. FIG. 7 shows a cross section taken along line VII-VII shown in FIG. 6. The battery herein described is, for example, a lithium ion secondary battery in which the capacity of an anode 22 is expressed based on insertion and extraction of lithium as an electrode reactant.

In the secondary battery, the battery element 20 having a flat spirally wound structure is mainly contained in a battery can 11.

The battery can 11 is, for example, a square package member. As shown in FIG. 7, the square package member has a shape with a cross section in the longitudinal direction of a rectangle or an approximate rectangle (including curved lines in part). The square package member structures not only a square battery in the shape of a rectangle, but also a square battery in the shape of an oval. That is, the square package member means a rectangle vessel-like member with the bottom or an oval vessel-like member with the bottom, which respectively has an opening in the shape of a rectangle or in the shape of an approximate rectangle (oval shape) formed by connecting circular arcs by straight lines. FIG. 7 shows a case that the battery can 11 has a rectangular cross sectional shape. The battery structure including the battery can 11 is called square structure.

The battery can 11 is made of, for example, a metal material such as iron, aluminum, or an alloy thereof. The battery can 11 may have a function as an electrode terminal as well. Specially, to prevent the secondary battery from being swollen by using the rigidity (less likely to deform) of the battery can 11 when charged and discharged, rigid iron is preferable to aluminum. In the case where the battery can 11 is made of iron, the battery can 11 may be plated by nickel or the like.

The battery can 11 has a hollow structure in which one end of the battery can 11 is closed and the other end thereof is opened. At the open end of the battery can 11, an insulating plate 12 and a battery cover 13 are attached, and thereby inside of the battery can 11 is hermetically closed. The insulating plate 12 is located between the battery element 20 and the battery cover 13, is arranged perpendicularly to the spirally wound circumferential face of the battery element 20, and is made of, for example, polypropylene or the like. The battery cover 13 is, for example, made of a material similar to that of the battery can 11, and also has a function as an electrode terminal as the battery can 11 does.

Outside of the battery cover 13, a terminal plate 14 as a cathode terminal is provided. The terminal plate 14 is electrically insulated from the battery cover 13 with an insulating case 16 in between. The insulating case 16 is made of, for example, polybutylene terephthalate or the like. In the approximate center of the battery cover 13, a through-hole is provided. A cathode pin 15 is inserted in the through-hole so that the cathode pin 15 is electrically connected to the terminal plate 14 and is electrically insulated from the battery cover 13 with a gasket 17 in between. The gasket 17 is made of, for example, an insulating material, and the surface thereof is coated with asphalt.

In the vicinity of the rim of the battery cover 13, a cleavage valve 18 and an injection hole 19 are provided. The cleavage valve 18 is electrically connected to the battery cover 13. If the internal pressure of the battery becomes a certain level or more by internal short circuit, external heating or the like, the cleavage valve 18 is separated from the battery cover 13 to release the internal pressure. The injection hole 19 is sealed by a sealing member 19A made of, for example, a stainless steel ball.

The battery element 20 is formed by layering a cathode 21 and the anode 22 with a separator 23 in between and then spirally winding the resultant laminated body. The battery element 20 is flat according to the shape of the battery can 11. A cathode lead 24 made of aluminum or the like is attached to an end of the cathode 21 (for example, the internal end thereof). An anode lead 25 made of nickel or the like is attached to an end of the anode 22 (for example, the outer end thereof). The cathode lead 24 is electrically connected to the terminal plate 14 by being welded to an end of the cathode pin 15. The anode lead 25 is welded and electrically connected to the battery can 11.

Figure 8:
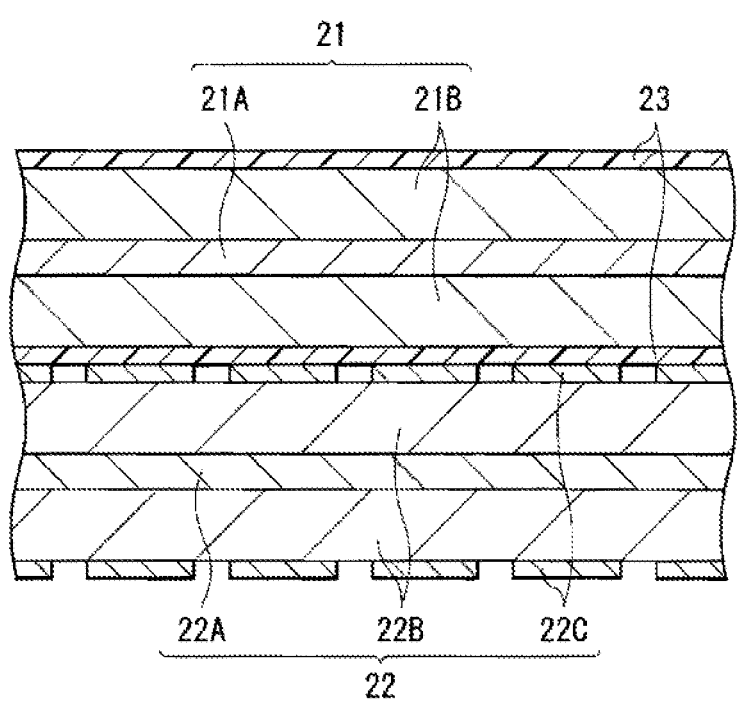
FIG. 8 is a cross section view showing an enlarged part of the battery element shown in FIG. 7.

FIG. 8 shows an enlarged part of the battery element 20 shown in FIG. 7. In the cathode 21, for example, a cathode active material layer 21B is provided on the both faces of a strip-shaped cathode current collector 21A. The cathode current collector 21A is made of, for example, a metal material such as aluminum, nickel, and stainless. The cathode active material layer 21B contains a cathode active material, and if necessary, may also contain other material such as a binder and an electrical conductor.

The cathode active material contains one or more cathode materials capable of inserting and extracting lithium as an electrode reactant. As the cathode material, for example, a lithium-containing compound is preferable, since thereby a high energy density is obtained. As the lithium-containing compound, for example, a complex oxide containing lithium and a transition metal element or a phosphate compound containing lithium and a transition metal element is cited. In particular, a compound containing at least one selected from the group consisting of cobalt, nickel, manganese, and iron as a transition metal element is preferable, since thereby a higher voltage is obtained. The chemical formula thereof is expressed as, for example, $Li_xM1O_2$ or $Li_yM2PO_4$. In the formula, M1 and M2 represent one or more transition metal elements. Values of x and y vary according to the charge and discharge state of the battery, and are generally in the range of $0.05 \leq x \leq 1.10$ and $0.05 \leq y \leq 1.10$.

As the complex oxide containing lithium and a transition metal element, for example, a lithium cobalt complex oxide ($Li_xCoO_2$), a lithium nickel complex oxide ($Li_xNiO_2$), a lithium nickel cobalt complex oxide ($Li_xNi_{(1-z)}Co_zO_2$ (z<1)), a lithium nickel cobalt manganese complex oxide ($Li_xNi_{(1-v-w)}Co_vMn_wO_2$ (v+w<1)), lithium manganese complex oxide having a spinel structure ($LiMn_2O_4$) or the like is cited. Specially, a complex oxide containing cobalt is preferable, since thereby a high capacity is obtained and superior cycle characteristics are obtained. As the phosphate compound containing lithium and a transition metal element, for example, lithium iron phosphate compound ($LiFePO_4$) or a lithium iron manganese phosphate compound ($LiFe_{(1-u)}Mn_uPO_4$ (u<1)) or the like is cited.

In addition, as the cathode material, for example, an oxide such as titanium oxide, vanadium oxide, and manganese dioxide; a disulfide such as titanium disulfide and molybdenum sulfide; a chalcogenide such as niobium selenide; sulfur; a conductive polymer such as polyaniline and polythiophene are cited.

The anode 22 has a structure similar to that of the anode described above. For example, in the anode 22, an anode active material layer 22B and a coat 22C are provided on the both faces of a strip-shaped anode current collector 22A. The structures of the anode current collector 22A, the anode active material layer 22B, and the coat 22C are respectively similar to the structures of the anode current collector 1, the anode active material layer 2, and the coat 3 in the anode described above. In the anode 22, the charge capacity of the anode active material capable of inserting and extracting lithium is preferably larger than the charge capacity of the cathode 21.

The separator 23 separates the cathode 21 from the anode 22, and passes ions as an electrode reactant while preventing current short circuit due to contact of the both electrodes. The separator 23 is made of, for example, a porous film made of a synthetic resin such as polytetrafluoroethylene, polypropylene, and polyethylene, or a ceramic porous film. The separator 23 may have a structure in which two or more porous films as the foregoing porous films are layered.

An electrolytic solution as a liquid electrolyte is impregnated in the separator 23. The electrolytic solution contains, for example, a solvent and an electrolyte salt dissolved therein.

The solvent contains, for example, one or more nonaqueous solvents such as an organic solvent. The nonaqueous solvents include, for example, an ester carbonate solvent such as ethylene carbonate, propylene carbonate, butylene carbonate, dimethyl carbonate, diethyl carbonate, ethyl methyl carbonate, and methylpropyl carbonate. Thereby, superior capacity characteristics, superior cycle characteristics, and superior storage characteristics are obtained. Above all, a mixture of a high-viscosity solvent such as ethylene carbonate and propylene carbonate and a low-viscosity solvent such as dimethyl carbonate, ethyl methyl carbonate, and diethyl carbonate is preferable. Thereby, the dissociation property of the electrolyte salt and the ion mobility are improved, and thus higher effects are obtained.

The solvent may contain halogenated ester carbonate, since thereby a stable coat is formed on the surface of the anode 22, and thus the decomposition reaction of the electrolytic solution is prevented and the cycle characteristics are improved. The halogenated ester carbonate may be a chain compound or a cyclic compound. The type of halogen is not particularly limited, but fluorine is especially preferable since thereby high effects are obtained. As a fluorinated ester carbonate, for example, a chain compound such as fluoromethylmethyl carbonate and bis(fluoromethyl) carbonate and a cyclic compound such as 4-fluoro-1,3-dioxolane-2-one and 4,5-difluoro-1,3-dioxolane-2-one is cited. One thereof may be singly, or a plurality thereof may be used by mixture. As 4,5-difluoro-1,3-dioxolane-2-one, a trans-isomer is more preferable than a cis-isomer, since the former is easily available and provides higher effects.

Further, the solvent may contains a cyclic ester carbonate having an unsaturated bond, since thereby the cycle characteristics are improved. As the cyclic ester carbonate having an unsaturated bond, for example, vinylene carbonate, vinyl ethylene carbonate and the like are cited. One thereof may be singly, or a plurality thereof may be used by mixture.

Further, the solvent may contain sultone, since thereby the cycle characteristics are improved, and the secondary battery is inhibited from being swollen. As the sultone, for example, 1,3-propene sultone or the like is cited.

In addition, the solvent may contain an acid anhydride, since thereby the cycle characteristics are improved. As the acid anhydride, for example, a succinic anhydride, a glutaric anhydride, a maleic anhydride, a sulfobenzoic anhydride, a sulfopropionic anhydride, a sulfobutyrate anhydride, an ethanedisulfonic anhydride, a propanedisulfonic anhydride, a benzenedisulfonic anhydride or the like is cited. One thereof may be used singly, or a plurality thereof may be used by mixture.

The electrolyte salt contains, for example, one or more light metal salts such as a lithium salt. As the lithium salt, for example, lithium hexafluorophosphate ($LiPF_6$), lithium tetrafluoroborate ($LiBF_4$), lithium perchlorate ($LiClO_4$), lithium hexafluoroarsenate ($LiAsF_6$) or the like is cited. Thereby, superior capacity characteristics, superior cycle characteristics, and superior storage characteristics are obtained. Specially, lithium hexafluorophosphate is preferable, since the internal resistance is lowered, and thus higher effects are obtained.

The content of the electrolyte salt in the solvent is, for example, in the range from 0.3 mol/kg to 3.0 mol/kg, since thereby superior capacity characteristics are obtained.

The secondary battery is manufactured, for example, by the following procedure.

First, the cathode 21 is formed. At first, a cathode active material, a binder, and an electrical conductor are mixed to prepare a cathode mixture, which is dispersed in an organic solvent to form paste cathode mixture slurry. Subsequently, the both faces of the cathode current collector 21A are uniformly coated with the cathode mixture slurry by using a doctor blade, a bar coater or the like, which is dried. Finally, the resultant is compression-molded by a rolling press machine or the like while being heated if necessary to form the cathode active material layer 21B. In this case, the resultant may be compression-molded over several times.

Further, the anode 22 is formed by forming the anode active material layer 22B and the coat 22C on the both faces of the anode current collector 22A by the same procedure as that of forming the anode described above.

Next, the battery element 20 is formed by using the cathode 21 and the anode 22. First, the cathode lead 24 is attached to the cathode current collector 21A by welding or the like, and the anode lead 25 is attached to the anode current collector 22A by welding or the like. Subsequently, the cathode 21 and the anode 22 are layered with the separator 23 in between, and spirally wound in the longitudinal direction. Finally, the resultant is shaped in the flat shape.

The secondary battery is assembled as follows. First, after the battery element 20 is contained in the battery can 11, the insulating plate 12 is arranged on the battery element 20. Subsequently, the cathode lead 24 is connected to the cathode pin 15 by welding or the like and the anode lead 25 is connected to the battery can 11 by welding or the like. After that, the battery cover 13 is fixed on the open end of the battery can 11 by laser welding or the like. Finally, the electrolytic solution is injected into the battery can 11 from the injection hole 19, and impregnated in the separator 23. After that, the injection hole 19 is sealed by the sealing member 19A. The secondary battery shown in FIG. 6 to FIG. 8 is thereby completed.

In the secondary battery, when charged, for example, lithium ions are extracted from the cathode 21, and are inserted in the anode 22 through the electrolytic solution impregnated in the separator 23. Meanwhile, when discharged, for example, lithium ions are extracted from the anode 22, and are inserted in the cathode 21 through the electrolytic solution impregnated in the separator 23.

According to the square secondary battery, since the anode 22 has the structure similar to that of the foregoing anode, superior cycle characteristics and safety are obtained. In this case, even when the anode 22 contains silicon advantageous for obtaining a high capacity, the cycle characteristics are improved. Thus, higher effects are thereby obtained than in a case where the anode contains other anode material such as a carbon material. Effects of the secondary battery other than the foregoing effects are similar to those of the foregoing anode.

Second Battery

Figure 9:
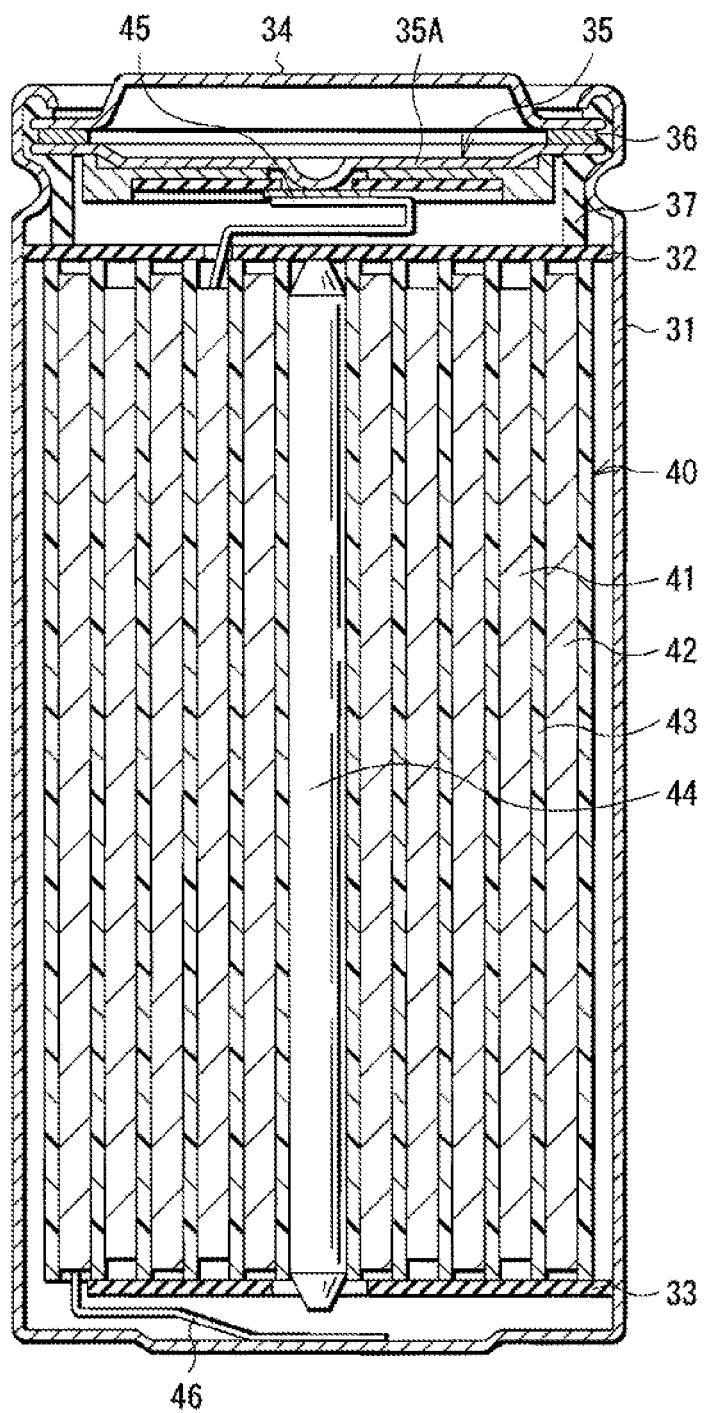
FIG. 9 is a cross section view showing a structure of a second battery including the anode according to the embodiment of the invention.
Figure 10:
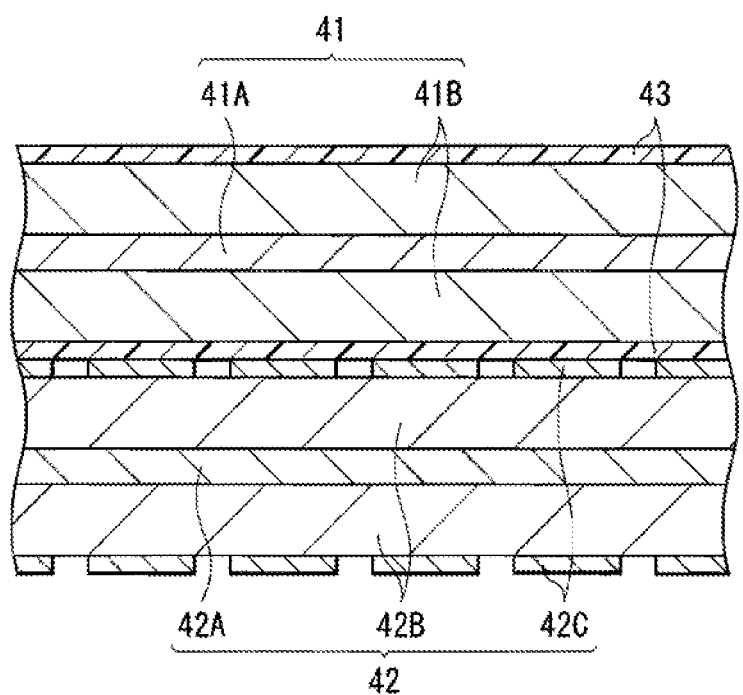
FIG. 10 is a cross section view showing an enlarged part of the spirally wound electrode body shown in FIG. 9.

FIG. 9 and FIG. 10 show a cross sectional structure of a second battery. FIG. 10 shows an enlarged part of a spirally wound electrode body 40 shown in FIG. 9. The battery is a lithium ion secondary battery as the foregoing first battery. The second battery contains the spirally wound electrode body 40 in which a cathode 41 and an anode 42 are spirally wound with a separator 43 in between, and a pair of insulating plates 32 and 33 inside a battery can 31 in the shape of an approximately hollow cylinder. The battery structure including the battery can 31 is a so-called cylindrical secondary battery.

The battery can 31 is made of, for example, a metal material similar to that of the battery can 11 in the foregoing first battery. One end of the battery can 31 is closed, and the other end thereof is opened. The pair of insulating plates 32 and 33 is arranged to sandwich the spirally wound electrode body 40 in between and to extend perpendicularly to the spirally wound periphery face.

At the open end of the battery can 31, a battery cover 34, and a safety valve mechanism 35 and a PTC (Positive Temperature Coefficient) device 36 provided inside the battery cover 34 are attached by being caulked with a gasket 37. Inside of the battery can 31 is thereby hermetically sealed. The battery cover 34 is made of, for example, a material similar to that of the battery can 31. The safety valve mechanism 35 is electrically connected to the battery cover 34 through the PTC device 36. In the safety valve mechanism 35, if the internal pressure becomes a certain level or more by internal short circuit, external heating or the like, a disk plate 35A flips to cut the electric connection between the battery cover 34 and the spirally wound electrode body 40. The PTC device 36 increases the resistance in accordance with temperature rise to limit a current and thereby preventing abnormal heat generation resulting from a large current. The gasket 37 is made of, for example, an insulating material and its surface is coated with asphalt.

A center pin 44 may be inserted in the center of the spirally wound electrode body 40. In the spirally wound electrode body 40, a cathode lead 45 made of aluminum or the like is connected to the cathode 41, and an anode lead 46 made of nickel or the like is connected to the anode 42. The cathode lead 45 is electrically connected to the battery cover 34 by being welded to the safety valve mechanism 35. The anode lead 46 is welded and thereby electrically connected to the battery can 31.

The cathode 41 has a structure in which, for example, a cathode active material layer 41B is provided on the both faces of a strip-shaped cathode current collector 41A. The anode 42 has a structure similar to that of the anode described above, for example, has a structure in which an anode active material layer 42B and a coat 42C are provided on the both faces of a strip-shaped anode current collector 42A. The structures of the cathode current collector 41A, the cathode active material layer 41B, the anode current collector 42A, the anode active material layer 42B, the coat 42C, and the separator 43 and the composition of the electrolytic solution are respectively similar to the structures of the cathode current collector 21A, the cathode active material layer 21B, the anode current collector 22A, the anode active material layer 22B, the coat 22C, and the separator 23 and the composition of the electrolytic solution in the foregoing first battery.

The secondary battery is manufactured, for example, as follows.

First, for example, the cathode 41 is formed by forming the cathode active material layer 41B on the both faces of the cathode current collector 41A, and the anode 42 is formed by forming the anode active material layer 42B and the coat 42C on the both faces of the anode current collector 42A by respective procedures similar to the procedures of forming the cathode 21 and the anode 22 in the foregoing first battery. Subsequently, the cathode lead 45 is attached to the cathode 41, and the anode lead 46 is attached to the anode 42. Subsequently, the cathode 41 and the anode 42 are spirally wound with the separator 43 in between, and thereby the spirally wound electrode body 40 is formed. The end of the cathode lead 45 is connected to the safety valve mechanism 35, and the end of the anode lead 46 is connected to the battery can 31. After that, the spirally wound electrode body 40 is sandwiched between the pair of insulating plates 32 and 33, and contained in the battery can 31. Subsequently, the electrolytic solution is injected into the battery can 31 and impregnated in the separator 43. Finally, at the open end of the battery can 31, the battery cover 34, the safety valve mechanism 35, and the PTC device 36 are fixed by being caulked with the gasket 37. The secondary battery shown in FIG. 9 and FIG. 10 is thereby completed.

In the secondary battery, when charged, for example, lithium ions are extracted from the cathode 41 and inserted in the anode 42 through the electrolytic solution impregnated in the separator 43. Meanwhile, when discharged, for example, lithium ions are extracted from the anode 42, and inserted in the cathode 41 through the electrolytic solution impregnated in the separator 43.

According to the cylindrical secondary battery, the anode 42 has the structure similar to that of the foregoing anode. Thus, superior cycle characteristics and safety are obtained. Effects of the secondary battery other than the foregoing effects are similar to those of the first battery.

Third Battery

Figure 11:
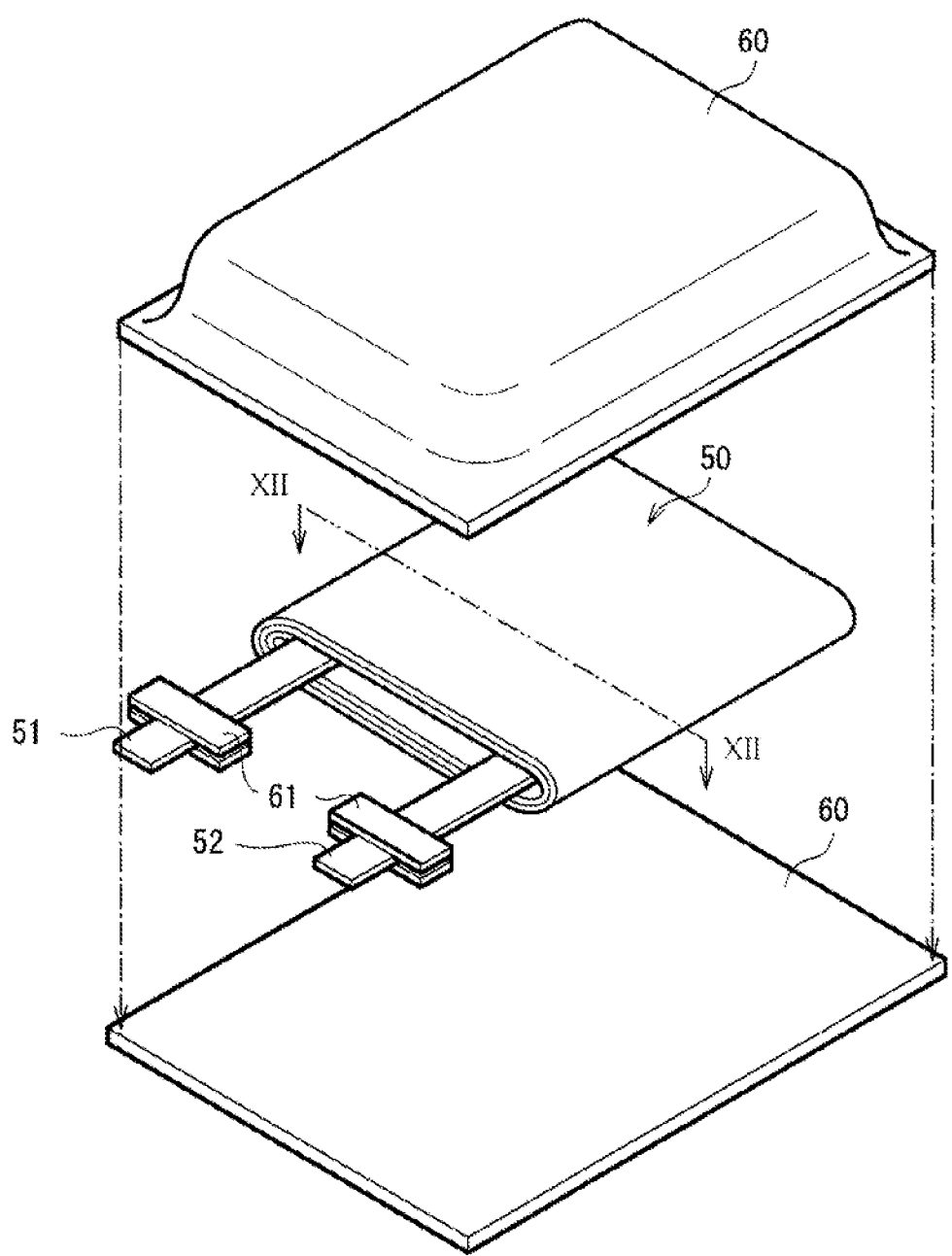
FIG. 11 is a perspective view showing a structure of a third battery including the anode according to the embodiment of the invention.
Figure 12:
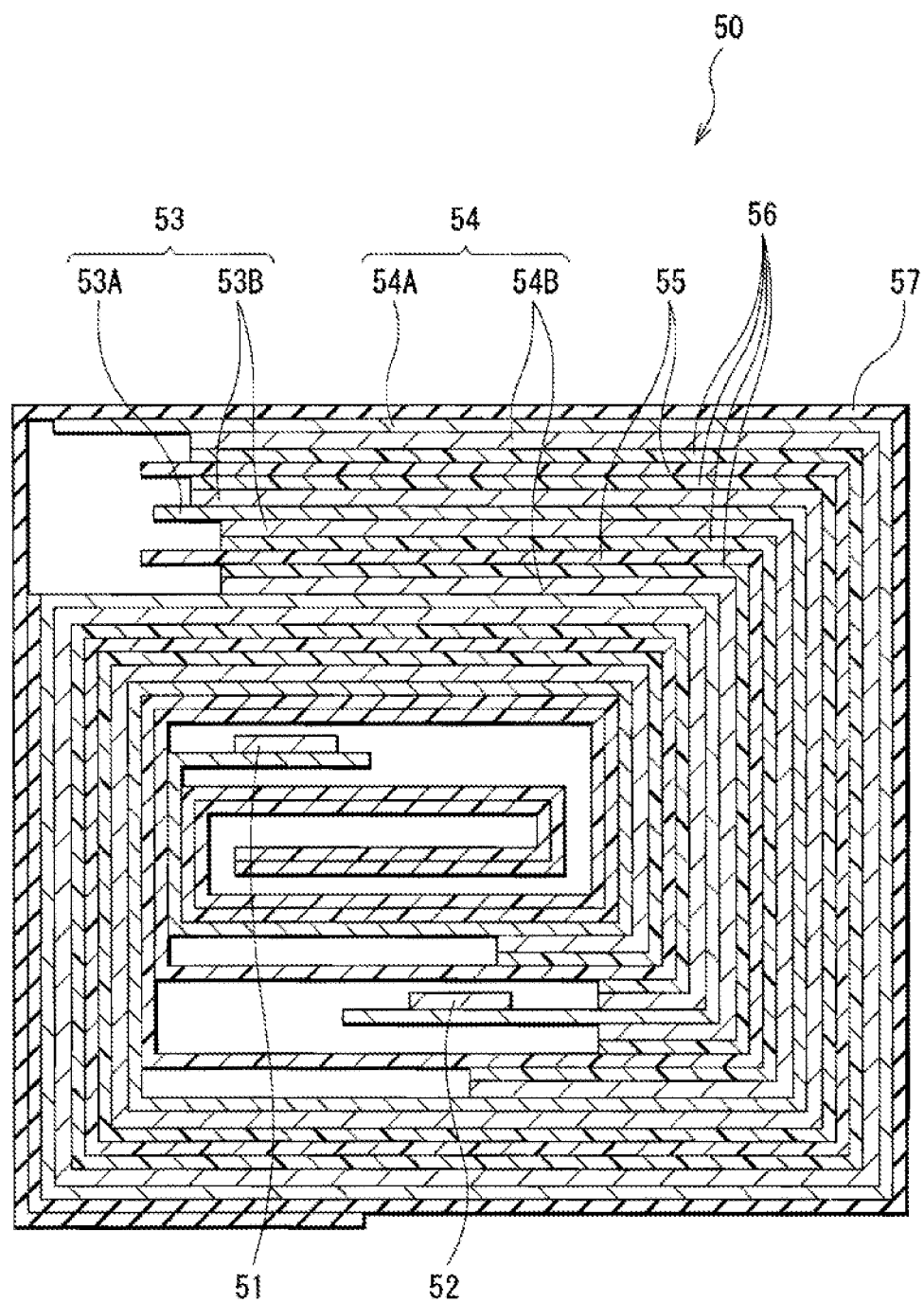
FIG. 12 is a cross section view taken along line XII-XII of the spirally wound electrode body shown in FIG. 11.

FIG. 11 shows an exploded perspective view of a third battery. FIG. 12 shows an exploded cross section taken along line XII-XII shown in FIG. 11. In the battery, a spirally wound electrode body 50 on which a cathode lead 51 and an anode lead 52 are attached is contained in a film package member 60. The battery structure including the package member 60 is a so-called laminated film structure.

The cathode lead 51 and the anode lead 52 are respectively directed from inside to outside of the package member 60 in the same direction, for example. The cathode lead 51 is made of, for example, a metal material such as aluminum, and the anode lead 52 is made of, for example, a metal material such as copper, nickel, and stainless. The metal materials are in the shape of a thin plate or mesh.

The package member 60 is made of an aluminum laminated film in which, for example, a nylon film, an aluminum foil, and a polyethylene film are bonded together in this order. The package member 60 has, for example, a structure in which the respective outer edges of two pieces of rectangle aluminum laminated films are bonded to each other by fusion bonding or an adhesive so that the polyethylene film and the spirally wound electrode body 50 are opposed to each other.

An adhesive film 61 to protect from entering of outside air is inserted between the package member 60 and the cathode lead 51, the anode lead 52. The adhesive film 61 is made of a material having contact characteristics to the cathode lead 51 and the anode lead 52. Examples of such a material include, for example, a polyolefin resin such as polyethylene, polypropylene, modified polyethylene, and modified polypropylene.

The package member 60 may be made of a laminated film having other lamination structure, a polymer film such as polypropylene, or a metal film, instead of the foregoing aluminum laminated film.

In the spirally wound electrode body 50, a cathode 53 and an anode 54 are layered with a separator 55 and an electrolyte 56 in between and then spirally wound. The outermost periphery thereof is protected by a protective tape 57.

Figure 13:
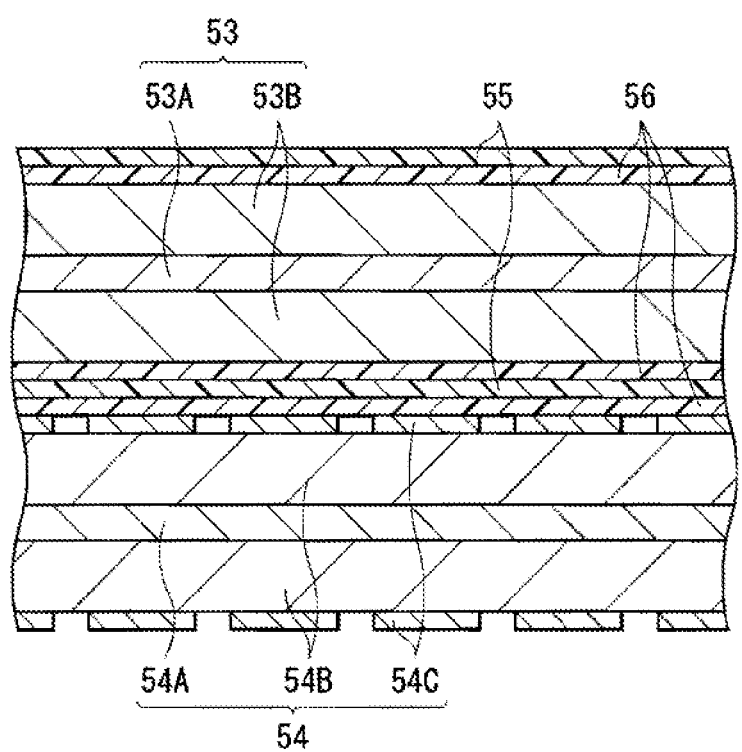
FIG. 13 is a cross section view showing an enlarged part of the spirally wound electrode body shown in FIG. 12.

FIG. 13 shows an enlarged part of the spirally wound electrode body 50 shown in FIG. 12. The cathode 53 has a structure in which, for example, a cathode active material layer 53B is provided on the both faces of a strip-shaped cathode current collector 53A. The anode 54 has a structure similar to that of the anode described above, for example, has a structure in which an anode active material layer 54B and a coat 54C are provided on the both faces of a strip-shaped anode current collector 54A. The structures of the cathode current collector 53A, the cathode active material layer 53B, the anode current collector 54A, the anode active material layer 54B, the coat 54C, and the separator 55 are respectively similar to those of the cathode current collector 21A, the cathode active material layer 21B, the anode current collector 22A, the anode active material layer 22B, the coat 22C, and the separator 23 of the foregoing first battery.

The electrolyte 56 is so-called gelatinous (gel electrolyte), containing an electrolytic solution and a polymer compound that holds the electrolytic solution. The gel electrolyte is preferable, since thereby high ion conductivity (for example, 1 mS/cm or more at room temperature) is obtained and liquid leakage is prevented. The electrolyte 56 is provided, for example, between the cathode 53 and the separator 55, and between the anode 54 and the separator 55.

As the polymer compound, for example, polyacrylonitrile, polyvinylidene fluoride, a copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethacrylic acid methyl, polyacrylic acid, polymethacrylic acid, styrene-butadiene rubber, nitrile-butadiene rubber, polystyrene, polycarbonate or the like is cited. One of these polymer compounds may be used singly, or a plurality thereof may be used by mixture. Specially, as the polymer compound, polyacrylonitrile, polyvinylidene fluoride, polyhexafluoropropylene, polyethylene oxide or the like is preferably used, since thereby the electrochemical stability is obtained.

The composition of the electrolytic solution is similar to the composition of the electrolytic solution in the first battery. However, in this case, the solvent means a wide concept including not only the liquid solvent but also a solvent having ion conductivity capable of dissociating the electrolyte salt. Therefore, when the polymer compound having ion conductivity is used, the polymer compound is also included in the solvent.

Instead of the gel electrolyte 56 in which the electrolytic solution is held by the polymer compound, the electrolytic solution may be directly used. In this case, the electrolytic solution is impregnated in the separator 55.

The secondary battery including the gel electrolyte 56 is manufactured, for example, by the following three manufacturing methods.

In a first manufacturing method, first, for example, the cathode 53 is formed by forming the cathode active material layer 53B on the both faces of the cathode current collector 53A, and the anode 54 is formed by forming the anode active material layer 54B and the coat 54C on the both faces of the anode current collector 54A by a procedure similar to that of the method of forming the cathode 21 and the anode 22 in the foregoing first battery. Subsequently, a precursor solution containing an electrolytic solution, a polymer compound, and a solvent is prepared. After the cathode 53 and the anode 54 are coated with the precursor solution, the solvent is volatilized to form the gel electrolyte 56. Subsequently, the cathode lead 51 is attached to the cathode current collector 53A and the anode lead 52 is attached to the anode current collector 54A. Subsequently, the cathode 53 and the anode 54 provided with the electrolyte 56 are layered with the separator 55 in between to obtain a laminated body. After that, the laminated body is spirally wound in the longitudinal direction, the protective tape 57 is adhered to the outermost periphery thereof to form the spirally wound electrode body 50. Finally, for example, after the spirally wound electrode body 50 is sandwiched between two pieces of the film package members 60, outer edges of the package members 60 are contacted by thermal fusion bonding or the like to enclose the spirally wound electrode body 50. At this time, the adhesive films 61 are inserted between the cathode lead 51, the anode lead 52 and the package member 60. Thereby, the secondary battery shown in FIG. 11 to FIG. 13 is completed.

In a second manufacturing method, first, the cathode lead 51 is attached to the cathode 53, and the anode lead 52 is attached to the anode 54. After that, the cathode 53 and the anode 54 are layered with the separator 55 in between and spirally wound. The protective tape 57 is adhered to the outermost periphery thereof, and thereby a spirally wound body as a precursor of the spirally wound electrode body 50 is formed. Subsequently, after the spirally wound body is sandwiched between two pieces of the film package members 60, the outermost peripheries except for one side are bonded by thermal fusion-bonding or the like to obtain a pouched state, and the spirally wound body is contained in the pouch-like package member 60. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 60. After that, the opening of the package member 60 is hermetically sealed by thermal fusion bonding or the like. Finally, the monomer is thermally polymerized to obtain a polymer compound. Thereby, the gel electrolyte 56 is formed. Accordingly, the secondary battery is completed.

In a third manufacturing method, first, the spirally wound body is formed and contained in the pouch-like package member 60 in the same manner as that of the foregoing first manufacturing method, except that the separator 55 with the both faces coated with a polymer compound is used. As the polymer compound with which the separator 55 is coated, for example, a polymer containing vinylidene fluoride as a component, that is, a homopolymer, a copolymer, a multicomponent copolymer and the like are cited. Specifically, polyvinylidene fluoride, a binary copolymer containing vinylidene fluoride and hexafluoropropylene as a component, a ternary copolymer containing vinylidene fluoride, hexafluoropropylene, and chlorotrifluoroethylene as a component and the like are cited. As a polymer compound, in addition to the foregoing polymer containing vinylidene fluoride as a component, another one or more polymer compounds may be used. Subsequently, an electrolytic solution is prepared and injected into the package member 60. After that, the opening of the package member 60 is sealed by thermal fusion bonding or the like. Finally, the resultant is heated while a weight is applied to the package member 60, and the separator 55 is contacted to the cathode 53 and the anode 54 with the polymer compound in between. Thereby, the electrolytic solution is impregnated into the polymer compound, and the polymer compound is gelated to form the electrolyte 56. Accordingly, the secondary battery is completed.

Further, in the third manufacturing method, swollenness of the secondary battery is suppressed compared to in the first manufacturing method. Further, in the third manufacturing method, the monomer as a raw material of the polymer compound, the solvent and the like are hardly left in the electrolyte 56 compared to the second manufacturing method, and the formation step of the polymer compound is favorably controlled. Thus, sufficient contact characteristics are obtained between the cathode 53/the anode 54/the separator 55 and the electrolyte 56.

According to the laminated film secondary battery, the anode 54 has the structure similar to that of the foregoing anode. Thus, superior cycle characteristics and safety are obtained. Effects of the secondary battery other than the foregoing effects are similar to those of the first battery.

EXAMPLES

Examples of the invention will be described in detail.

Example 1-1

Figure 14:
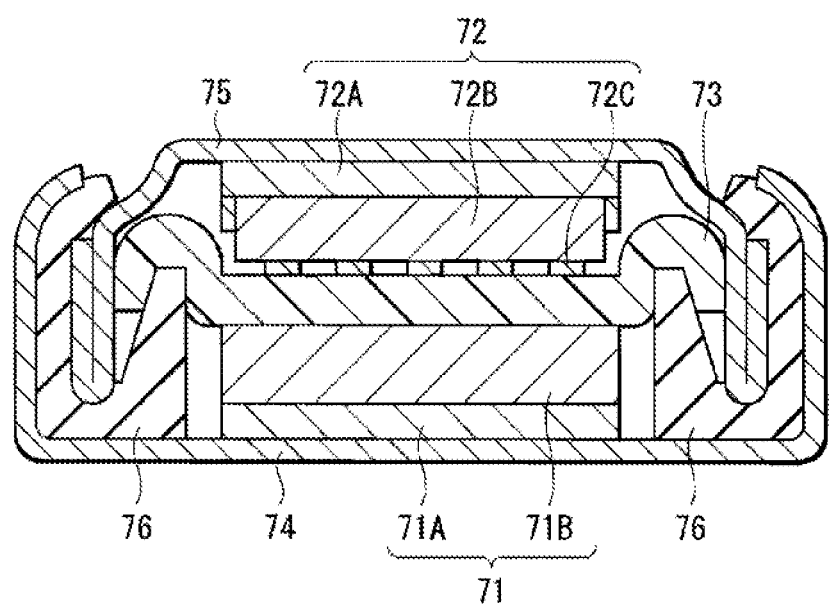
FIG. 14 is a cross section view showing a structure of a battery fabricated in examples.

To examine the cycle characteristics, the coin-type secondary battery shown in FIG. 14 was fabricated by the following procedure. The secondary battery was fabricated as a lithium ion secondary battery in which the capacity of an anode 72 was expressed based on insertion and extraction of lithium.

First, a cathode 71 was formed. First, lithium carbonate ($Li_2CO_3$) and cobalt carbonate ($CoCO_3$) were mixed at a molar ratio of 0.5:1. After that, the mixture was fired in the air at 900 deg C. for 5 hours. Thereby, lithium cobalt complex oxide ($LiCoO_2$) was obtained. Subsequently, 91 parts by weight of the lithium cobalt complex oxide as a cathode active material, 6 parts by weight of graphite as an electrical conductor, and 3 parts by weight of polyvinylidene fluoride as a binder were mixed to obtain a cathode mixture. After that, the cathode mixture was dispersed in N-methyl-2-pyrrolidone (NMP) to obtain paste slurry. Subsequently, a single face of a cathode current collector 71A made of a strip-shaped aluminum foil (thickness: 12 µm thick) was uniformly coated with the slurry, which was dried. After that, the resultant was compression-molded by a roll pressing machine to form a cathode active material layer 71B. Finally, the cathode current collector 71A on which the cathode active material layer 71B was formed was punched out in a state of a pellet being 15.2 mm in diameter.

Next, the anode 72 was formed. First, an anode current collector 72A made of an electrolytic copper foil (thickness: 18 µm) was prepared. After that, silicon as an anode active material was deposited on a single face of the anode current collector 72A by electron beam evaporation method to form a plurality of anode active particles, and thereby an anode active material layer 72B (thickness: 6 µm) was formed. When the anode active material layer 72B was formed, the anode active material was deposited six times for every 1 µm to obtain the six-layer anode active material particles. Further, oxygen gas was introduced into a chamber when the anode active material was deposited, and oxygen in the air was continuously introduced into the chamber after deposition was completed so that the anode active material particle included a striped high-oxygen concentration region. Subsequently, a plating solution for electrolytic plating was prepared by mixing ethanol ($C_2H_5OH$) and aluminum nitrate enneahydrate ($Al(NO_3)_3.9H_2O$) at a weight ratio of 19:1. The solution was prepared with the use of the plating solution in the plating bath. An aluminum plate was connected to the anode at a distance of 5 mm, and the anode current collector 72A on which the anode active material layer 72B was formed was connected to the cathode. Subsequently, electrolytic plating reaction was performed under the conditions of an ambient temperature (23 deg) and a constant voltage (15 V), aluminum hydroxide was precipitated on the anode active material layer 72B, and thereby a plate-like coat 72C that was divided into a plurality of portions was formed. The reaction when the coat 72C was formed is expressed as $Al^{3+}+3OH^- \rightarrow Al(OH)_3$. When the coat 72C was formed, the precipitation amount of aluminum hydroxide was adjusted by the current amount applied to the plating solution, and the weight per unit area of the coat 72C (hereinafter referred to as "unit weight" ($mg/cm^2$)) was 0.01 $mg/cm^2$. The weight of the coat 72C was calculated based on the weight difference between before precipitation of aluminum hydroxide and after precipitation of aluminum hydroxide. When the surface of the anode 72 was observed by SEM-EDX, and the ratio of the area S2 of the coat 72C to the area S1 of the anode active material layer 72B (the area ratio S2/S1) was calculated, it was 0.2. Finally, the anode current collector 72A on which the anode active material layer 72B and the coat 72C were formed was punched out into a pellet being 15.5 mm in diameter.

Next, 4-fluoro-1,3-dioxolane-2-one (FEC) and diethyl carbonate (DEC) were mixed as a solvent, and lithium hexafluorophosphate and lithium tetrafluoroborate were dissolved therein as an electrolyte salt to prepare an electrolytic solution. The composition of the solvent (FEC:DEC) was 50:50 at a weight ratio. The concentration of lithium hexafluorophosphate in the electrolytic solution was 1 mol/kg, and the concentration of lithium tetrafluoroborate in the electrolytic solution was 0.1 mol/kg.

Finally, the secondary battery was assembled by using the cathode 71, the anode 72, and the electrolytic solution. First, the cathode 71 was contained in a package can 74, and the anode 72 was bonded to a package cup 75. Subsequently, a separator 73 (thickness: 16 µm) made of a porous propylene film was prepared, and an electrolytic solution was impregnated in the separator 73. Finally, the cathode 71 and the anode 72 were layered with the separator 73 impregnated with the electrolytic solution in between. After that, the package can 74 and the package cup 75 were caulked with a gasket 76. Thereby, the coin-type secondary battery was completed.

In examining the cycle characteristics, initial charge and discharge were performed to stabilize the battery state. After that, charge and discharge were performed 1 cycle in the atmosphere at 23 deg C. and the discharge capacity was measured, and continuously charge and discharge were performed 99 cycles in the same atmosphere and the discharge capacity was measured. Thereby, the discharge capacity retention ratio (%)=(discharge capacity at the 100th cycle/discharge capacity at the first cycle)×100 was calculated. The charge and discharge conditions for the initial charge and discharge were as follows. That is, constant current charge was performed at the current of 0.2 C until the upper battery voltage of 4.2 V, charge was continuously performed at the constant voltage of 4.2 V until the current became 0.05 C. After that, discharge was performed at the constant current of 0.2 C until the final voltage of 2.5 V. The charge and discharge conditions for 1 cycle were as follows. That is, constant current charge was performed at the current of 1 C until the upper battery voltage of 4.2 V, charge was continuously performed at the constant voltage of 4.2 V until the current became 0.05 C. After that, discharge was performed at the constant current of 1 C until the final voltage of 2.5 V. The foregoing "0.2 C" means a current value with which the theoretical capacity is completely discharged in 5 hours. "0.05 C" means a current value with which the theoretical capacity is completely discharged in 20 hours. "1 C" means a current value with which the theoretical capacity is completely discharged in 1 hour.

In addition to the foregoing coin-type secondary battery, to examine the safety, the square secondary battery shown in FIG. 6 to FIG. 8 was fabricated by a procedure similar to the procedure of fabricating the coin-type secondary battery, except for the following procedure. When the square secondary battery was fabricated, first, the cathode 21 was formed by forming the cathode active material layer 21B on the both faces of the cathode current collector 21A, and the anode 22 was formed by forming the anode active material layer 22B and the coat 22C on the both faces of the anode current collector 22A. Subsequently, the cathode lead 24 made of aluminum was welded to the cathode 21, and the anode lead 25 made of nickel was welded to the anode 22. Subsequently, the cathode 21 and the anode 22 were layered with the separator 23 in between, and spirally wound in the longitudinal direction. After that, the resultant was shaped into the flat shape, and thereby the battery element 20 was formed. Subsequently, after the battery element 20 was contained in the battery can 11 made of aluminum, the insulating plate 12 was arranged on the battery element 20. Subsequently, the cathode lead 24 was welded to the cathode pin 15 and the anode lead 25 was welded to the battery can 11. After that, the battery cover 13 was fixed on the open end of the battery can 11 by laser welding or the like. Finally, the electrolytic solution was injected into the battery can 11 through the injection hole 19. After that, the injection hole 19 was sealed by the sealing member 19A. The square secondary battery was thereby fabricated.

To examine the safety, a state when the battery was broken was examined by performing round bar crush test. Specifically, constant current and constant voltage charge was performed at the current of 1 C until the upper battery voltage of 4.4 V. After that, while the temperature of the battery can 11 was measured by a thermocouple in the air (23 deg C.), a round bar (diameter: 10 mm) was pressed on the planar portion thereof to totally crush the battery. Thereby, temperature change after the test was evaluated based on 4 grades. The evaluation was as follows in the order of most favorable to the least favorable. That is, in the case that the highest temperature did not exceed 100 deg C., it was graded as "very good". In the case that the highest temperature did not exceed 200 deg C., it was graded as "good". In the case that the highest temperature did not exceed 300 deg C., it was graded as "average". In the case that the highest temperature exceed 300 deg C., it was graded as "poor".

Examples 1-2 to 1-11

A procedure was performed in the same manner as that of Example 1-1, except that the unit weight was changed to 0.02 mg/cm$^2$ (Example 1-2), 0.04 mg/cm$^2$ (Example 1-3), 0.06 mg/cm$^2$ (Example 1-4), 0.08 mg/cm$^2$ (Example 1-5), 0.1 mg/cm$^2$ (Example 1-6), 0.2 mg/cm$^2$ (Example 1-7), 0.4 mg/cm$^2$ (Example 1-8), 0.6 mg/cm$^2$ (Example 1-9), 0.8 mg/cm$^2$ (Example 1-10), or 1 mg/cm$^2$ (Example 1-11). The area ratio S2/S1 was 0.4 in Example 1-2, 0.8 in Example 1-3, and 0.9 in Examples 1-4 to 1-11.

Comparative Example 1-1

A procedure was performed in the same manner as that of Example 1-1, except that the coats 72C and 22C were not formed.

Comparative Examples 1-2 to 1-12

A procedure was performed in the same manner as that of Examples 1-1 to 1-11, except that a coat in a state of a plurality of particles was formed instead of the plate-like coats 72C and 22C divided into a plurality of portions. When the coat was formed, aluminum hydroxide powder (average particle diameter: 1 μm) and polyvinylidene fluoride were mixed at a weight ratio of 95:5, the mixture was dispersed in NMP to obtain slurry. While the coating amount was adjusted so that the unit weight was equal to that of Examples 1-1 to 1-11, the surface of the anode active material layers 72B and 22B was coated with the slurry and the resultant was dried. The foregoing average particle diameter was a median size measured by laser diffractive particle size distribution size measuring device. The same will be applied to the following descriptions.

When the cycle characteristics and the safety of the secondary batteries of Examples 1-1 to 1-11 and Comparative examples 1-1 to 1-12 were examined, the results shown in Table 1 were obtained.

TABLE 1

| | Anode | | | | | | Discharge capacity | |
|---|---|---|---|---|---|---|---|---|
| | Anode active material layer | | Coat | | | | | |
| | Anode active material | Forming method | Type | Forming method | Unit weight (mg/cm$^2$) | Area ratio S2/S1 | retention ratio (%) | Round bar crush test evaluation |
| Example 1-1 | Silicon | Evaporation method | Aluminum hydroxide | Plating method | 0.01 | 0.2 | 82 | good |
| Example 1-2 | | | | | 0.02 | 0.4 | 83 | very good |
| Example 1-3 | | | | | 0.04 | 0.8 | 84 | very good |
| Example 1-4 | | | | | 0.06 | 0.9 | 84 | very good |
| Example 1-5 | | | | | 0.08 | 0.9 | 84 | very good |
| Example 1-6 | | | | | 0.1 | 0.9 | 84 | very good |
| Example 1-7 | | | | | 0.2 | 0.9 | 84 | very good |
| Example 1-8 | | | | | 0.4 | 0.9 | 83 | very good |
| Example 1-9 | | | | | 0.6 | 0.9 | 82 | very good |
| Example 1-10 | | | | | 0.8 | 0.9 | 81 | very good |
| Example 1-11 | | | | | 1 | 0.9 | 81 | very good |
| Comparative example 1-1 | Silicon | Evaporation method | — | — | — | — | 81 | poor |
| Comparative example 1-2 | | | Aluminum hydroxide | Coating method | 0.01 | — | 81 | poor |
| Comparative example 1-3 | | | | | 0.02 | | 81 | poor |
| Comparative example 1-4 | | | | | 0.04 | | 81 | average |
| Comparative example 1-5 | | | | | 0.06 | | 81 | average |

TABLE 1-continued

| | Anode | | | | | | | |
|---|---|---|---|---|---|---|---|---|
| | Anode active material layer | | | Coat | | | Discharge capacity | |
| | Anode active material | Forming method | Type | Forming method | Unit weight (mg/cm$^2$) | Area ratio S2/S1 | retention ratio (%) | Round bar crush test evaluation |
| Comparative example 1-6 | | | | | 0.08 | | 81 | good |
| Comparative example 1-7 | | | | | 0.1 | | 81 | good |
| Comparative example 1-8 | | | | | 0.2 | | 80 | very good |
| Comparative example 1-9 | | | | | 0.4 | | 79 | very good |
| Comparative example 1-10 | | | | | 0.6 | | 77 | very good |
| Comparative example 1-11 | | | | | 0.8 | | 75 | very good |
| Comparative example 1-12 | | | | | 1 | | 73 | very good |

As shown in FIG. 1, in Examples 1-1 to 1-11 in which the coats 72C and 22C were formed, compared to Comparative example 1-1 in which the coats 72C and 22C were not formed, the discharge capacity retention ratio was equal to or higher than that of Comparative example 1-1, and the evaluation of the round bar crush test was improved.

Further, in Examples 1-1 to 1-11 in which the plate-like coats 72C and 22C divided into a plurality of portions were formed by electrolytic plating method, compared to Comparative examples 1-2 to 1-12 in which the coat in a state of a plurality of particles was formed by coating method, the discharge capacity retention ratio was higher than those of Comparative examples 1-2 to 1-12 for every unit weight, and the evaluation of the round bar crush test was equal to or higher than those of Comparative examples 1-2 to 1-12.

For confirmation, as a representative of Examples 1-1 to 1-11, for the secondary battery of Example 1-5, element analysis was performed for the coats 72C and 22C by XPS, resulting in 23 atomic % for aluminum and 77 atomic % for oxygen. From the results, since the abundance ratio between aluminum and oxygen was 1:3 at a ratio with the use of approximate integer numbers, it was determined that the coats 72C and 22C were aluminum hydroxide.

Accordingly, in the secondary battery of the invention, it was confirmed that when the anode active material layer was formed by evaporation method with the use of silicon as an anode active material, by forming aluminum hydroxide as an insulative coat divided into a plurality of portions on the anode active material layer, superior cycle characteristics and safety could be obtained. In this case, it was also confirmed that it was enough that the unit weight was in the range from 0.01 mg/cm$^2$ to 1 mg/cm$^2$ and the area ratio S2/S1 was in the range from 0.2 to 0.9.

Examples 2-1 and 2-2

A procedure was performed in the same manner as that of Example 1-6, except that a plating solution was prepared by using zirconium nitrate or titanium nitrate instead of aluminum nitrate, and zirconium hydroxide (Example 2-1) or titanium hydroxide (Example 2-2) instead of aluminum hydroxide was precipitated to form the coats 72C and 22C.

Example 2-3

A procedure was performed in the same manner as that of Example 1-6, except that aluminum hydroxide formed as the coats 72C and 22C was heated in the vacuum atmosphere at 700 deg C. to obtain aluminum oxide.

Examples 2-4 and 2-5

A procedure was performed in the same manner as that of Examples 2-1 and 2-2, except that zirconium hydroxide or titanium hydroxide formed as the coats 72C and 22C was heated in the vacuum atmosphere at 700 deg C. to obtain zirconium oxide (Example 2-4) or titanium oxide (Example 2-5).

When the cycle characteristics and the safety of the secondary batteries of Examples 2-1 to 2-5 were examined, the results shown in Table 2 were obtained.

TABLE 2

| | Anode | | | | | | | |
|---|---|---|---|---|---|---|---|---|
| | Anode active material layer | | | Coat | | | Discharge capacity | |
| | Anode active material | Forming method | Type | Forming method | Unit weight (mg/cm$^2$) | Area ratio S2/S1 | retention ratio (%) | Round bar crush test evaluation |
| Example 1-6 | Silicon | Evaporation method | Aluminum hydroxide | Plating method | 0.1 | 0.9 | 84 | very good |
| Example 2-1 | | | Zirconium hydroxide | | | | 84 | very good |

TABLE 2-continued

| | Anode active material layer | | Coat | | | | Discharge capacity | |
|---|---|---|---|---|---|---|---|---|
| | Anode active material | Forming method | Type | Forming method | Unit weight (mg/cm$^2$) | Area ratio S2/S1 | retention ratio (%) | Round bar crush test evaluation |
| Example 2-2 | | | Titanium hydroxide | | | | 84 | very good |
| Example 2-3 | | | Aluminum oxide | | | | 81 | very good |
| Example 2-4 | | | Zirconium oxide | | | | 84 | very good |
| Example 2-5 | | | Titanium oxide | | | | 84 | very good |
| Comparative example 1-1 | Silicon | Evaporation method | — | — | — | — | 81 | x |
| Comparative example 1-7 | | | Aluminum hydroxide | Coating method | 0.1 | — | 81 | ○ |

As shown in Table 2, in Examples 2-1 to 2-5 in which the coats 72C and 22C were formed, compared to Comparative examples 1-1 and 1-7 in which the coats 72C and 22C were not formed, the discharge capacity retention ratio was higher than that of Comparative examples 1-1 and 1-7, and the evaluation of the round bar crush test was improved as in Example 1-6.

For confirmation, as a representative of Examples 2-1 to 2-5, for the secondary battery of Example 2-3, element analysis was performed for the coats 72C and 22C by XPS, resulting in 38 atomic % for aluminum and 62 atomic % for oxygen. From the results, since the abundance ratio between aluminum and oxygen was 2:3 at a ratio with the use of approximate integer numbers, it was determined that the coats 72C and 22C were aluminum.

Accordingly, in the secondary battery of the invention, it was confirmed that when zirconium hydroxide was used as a material for forming the coat, superior cycle characteristics and safety were obtained as well.

Examples 3-1 to 3-5

A procedure was performed in the same manner as that of Examples 1-2 to 1-6, except that the anode active material layers 72B and 22B were formed by coating method instead of electron beam evaporation method. When the anode active material layers 72B and 22B were formed, silicon particles as an anode active material (average particle diameter: 3 μm) and 15 wt % NMP solution of polyimide as a binder, and scale-like high crystalline artificial graphite as an electrical conductor were mixed at a weight ratio of 70:10:10 to obtain slurry. After that, the surface of the anode current collectors 72A and 22A was coated with the slurry, and then the resultant was dried and then compression-molded.

Comparative Example 3

A procedure was performed in the same manner as that of Comparative example 1-1, except that the anode active material layers 72B and 22B were formed by coating method as in Examples 3-1 to 3-5.

When the cycle characteristics and the safety of the secondary batteries of Examples 3-1 to 3-5 and Comparative example 3 were examined, the results shown in Table 3 were obtained.

TABLE 3

| | Anode active material layer | | Coat | | | | Discharge capacity | |
|---|---|---|---|---|---|---|---|---|
| | Anode active material | Forming method | Type | Forming method | Unit weight (mg/cm$^2$) | Area ratio S2/S1 | retention ratio (%) | Round bar crush test evaluation |
| Example 3-1 | Silicon | Coating method | Aluminum hydroxide | Plating method | 0.02 | 0.4 | 80 | average |
| Example 3-2 | | | | | 0.04 | 0.8 | 80 | good |
| Example 3-3 | | | | | 0.06 | 0.9 | 81 | good |
| Example 3-4 | | | | | 0.08 | 0.9 | 81 | very good |
| Example 3-5 | | | | | 0.1 | 0.9 | 81 | very good |
| Comparative example 3 | Silicon | Coating method | — | — | — | — | 80 | poor |

As shown in Table 3, in Examples 3-1 to 3-5 in which the coats 72C and 22C were formed, compared to Comparative example 3 in which the coats 72C and 22C were not formed, the discharge capacity retention ratio was equal to or higher than that of Comparative example 3, and the evaluation of the round bar crush test was improved.

Accordingly, in the secondary battery of the invention, it was confirmed that when the anode active material layer was formed by coating method with the use of silicon as an anode active material, by forming aluminum hydroxide as an insulative coat divided into a plurality of portions on the anode active material layer, superior cycle characteristics and safety were obtained as well.

Examples 4-1 4-5

A procedure was performed in the same manner as that of Examples 1-2 to 1-6, except that the anode active material layers 72B and 22B were formed by coating method with the use of Mesophase Carbon Microbeads (MCMB) instead of silicon as an anode active material. When the anode active material layers 72B and 22B were formed, the MCMB as the anode active material (average particle diameter: 20 μm), polyvinylidene fluoride as a binder, and Vapor Growth Carbon Fiber (VGCF) as an electrical conductor were mixed at a weight ratio of 90:7:3, and the resultant mixture was dispersed in NMP as an additional portion to obtain a slurry. The anode current collectors 72A and 22A were coated with the slurry, the resultant was dried, and then compression-molded.

Comparative Example 4

A procedure was performed in the same manner as that of Comparative example 1-1, except that the anode active material layers 72B and 22B were formed by coating method with the use of MCMB as in Examples 4-1 to 4-5.

When the cycle characteristics and the safety of the secondary batteries of Examples 4-1 to 4-5 and Comparative example 4 were examined, the results shown in Table 4 were obtained.

TABLE 4

| | Anode | | | | | | | |
|---|---|---|---|---|---|---|---|---|
| | Anode active material layer | | Coat | | | | Discharge capacity | |
| | Anode active material | Forming method | Type | Forming method | Unit weight (mg/cm$^2$) | Area ratio S2/S1 | retention ratio (%) | Round bar crush test evaluation |
| Example 4-1 | MCMB | Coating method | Aluminum hydroxide | Plating method | 0.02 | 0.4 | 87 | good |
| Example 4-2 | | | | | 0.04 | 0.8 | 87 | good |
| Example 4-3 | | | | | 0.06 | 0.9 | 87 | good |
| Example 4-4 | | | | | 0.08 | 0.9 | 87 | very good |
| Example 4-5 | | | | | 0.1 | 0.9 | 87 | very good |
| Comparative example 4 | MCMB | Coating method | — | — | — | — | 87 | average |

As shown in Table 4, in Examples 4-1 to 4-5 in which the coats 72C and 22C were formed, compared to Comparative example 4 in which the coats 72C and 22C were not formed, the discharge capacity retention ratio was equal to that of Comparative example 4, and the evaluation of the round bar crush test was improved.

Accordingly, in the secondary battery of the invention, it was confirmed that when the anode active material layer was formed by coating method with the use of MCMB as an anode active material, by forming aluminum hydroxide as an insulative coat divided into a plurality of portions on the anode active material layer, superior cycle characteristics and safety were obtained as well.

As evidenced by the foregoing results of FIG. 1 to FIG. 4, it was confirmed that into the secondary battery of the invention, by forming the insulative coat segmented in a plurality of sections on the anode active material layer, superior cycle characteristics and superior safety were obtained irrespective of the type of the anode active material and the method of forming the anode active material layer.

When MCMB (carbon material) was used as an anode active material, the discharge capacity retention ratio was not increased. Meanwhile, when silicon (material that is able to insert and extract lithium and contains at least one of metal elements and metalloid elements) was used, the discharge capacity retention ratio was increased. Thus, it was confirmed that higher effects were obtained in the latter case. The result may show the following. That is, when silicon advantageous for realizing a high capacity was used as an anode active material, the electrolytic solution tended to be easily decomposed than in the case of using a carbon material. Thus, when silicon was used, effects of inhibiting decomposition of the electrolytic solution was significantly demonstrated.

The invention has been described with reference to the embodiment and the examples. However, the invention is not limited to the aspects described in the foregoing embodiment and the foregoing examples, and various modifications may be made. For example, the anode of the invention is not necessarily used for the battery, but may be used for an electrochemical device other than the battery. As other application, for example, a capacitor or the like is cited.

Further, in the foregoing embodiment and the foregoing examples, the descriptions have been given of the lithium ion secondary battery in which the anode capacity is expressed based on insertion and extraction of lithium as a battery type. However, the battery type of the invention is not limited thereto. The invention is similarly applicable to a battery in which the anode capacity includes the capacity associated with insertion and extraction of lithium and the capacity associated with precipitation and dissolution of lithium, and the anode capacity is expressed as the sum of these capacities, by setting the charge capacity of the anode material capable of inserting and extracting lithium to a smaller value than the charge capacity of the cathode.

Further, in the foregoing embodiment and the foregoing examples, the descriptions have been given of the case using the electrolytic solution or the gel electrolyte in which the electrolytic solution is held by the polymer compound as an electrolyte of the battery of the invention. However, other type of electrolyte may be used. As other electrolyte, for example, a mixture obtained by mixing an ion conductive inorganic compound such as ion conductive ceramics, ion conductive glass, and ionic crystal and an electrolytic solution; a mixture obtained by mixing other inorganic compound and an electrolytic solution; a mixture of the foregoing inorganic compound and a gel electrolyte or the like is cited.

Further, in the foregoing embodiment and the foregoing examples, the description has been given with the specific examples of the square, cylindrical, laminated film, or coin-type secondary battery as a battery structure, and with the specific example of the battery in which the battery element has the spirally wound structure. However, the invention is similarly applicable to a battery having other battery structure such as a button-type battery, or a battery in which the battery element has other structure such as a lamination structure. The battery of the invention is similarly applicable to other type of battery such as a primary battery in addition to the secondary battery.

Further, in the foregoing embodiment and the foregoing examples, the description has been given of the case using lithium as an electrode reactant. However, as an electrode reactant, other Group 1A element such as sodium (Na) and potassium (K), a Group 2A element such as magnesium (Mg) and calcium (Ca), or other light metal such as aluminum may be used. In these cases, the anode material described in the foregoing embodiment may be used as an anode active material as well.

Further, in the foregoing embodiment and the foregoing examples, regarding the area ratio S2/S1 for the anode or the battery of the invention, the numerical value range thereof derived from the results of the examples has been described as the appropriate range. However, such a description does not totally eliminate the possibility that the area ratio S2/S1 may be out of the foregoing range. That is, the foregoing appropriate range is the range particularly preferable for obtaining the effects of the invention. Therefore, as long as effects of the invention are obtained, the area ratio S2/S1 may be out of the foregoing range in some degrees. The same is applied to the weight per unit area of the coat and the like, in addition to the foregoing area ratio S2/S1.

It should be understood by those skilled in the art that various modifications, combinations, sub-combinations and alternations may occur depending on design requirements and other factors insofar as they are within the scope of the appended claims or the equivalents thereof.

What is claimed is:

1. An anode comprising:
an anode current collector;
an active material layer on the anode current collector, the active material layer having a first surface facing away from the anode current collector and a second surface facing toward the anode current collector; and
an insulative coat on the first surface of the anode active material layer,
wherein,
the insulative coat comprises a plurality of spaced apart portions across the first surface that leave portions of the first surface exposed,
the anode active material layer contains a plurality of anode active material particles with facing surfaces that are not covered by the insulative coat,
the spaced apart portions of the insulative coat and the facing surfaces of the anode active material particles that are not covered by the insulative coat provide one or more migration paths for an electrode reactant to the active material layer between the space apart portions, and
the insulative coat comprises a material having a specific heat at 300° Kelvin of 1.7 J/K·g or more.

2. The anode according to claim 1, wherein the insulative coat is in the form of a plate.

3. The anode according to claim 1, wherein the plurality of anode active material particles contain silicon.

4. The anode according to claim 1, wherein where an area of the anode active material layer is S1 and an area of the insulative coat is S2, and an area ratio S2/S1 is in a range from 0.2 to 0.9, inclusive.

5. The anode according to claim 1, wherein a weight per unit area of the insulative coat is in a range from 0.02 mg/cm$^2$ to 1 mg/cm$^2$, inclusive.

6. The anode according to claim 1, wherein the active material layer comprises a plurality of layers.

7. The anode according to claim 1, wherein the insulative coat extends along surfaces of two or more of the anode active material particles.

8. The anode according to claim 1, wherein the insulative coat comprises at least one of a metal hydroxide or a metal oxide.

9. A battery comprising:
a cathode;
an anode comprising (a) an anode current collector, (b) an active material layer on the anode current collector, the active material layer having a first surface facing away from the anode current collector and a second surface facing toward the anode current collector, and (c) an insulative coat on the first surface of the anode active material layer; and
an electrolytic solution,
wherein,
the insulative coat comprises a plurality of spaced apart portions across the first surface that leaves portions of the first surface exposed,
the anode active material layer contains a plurality of anode active material particles with facing surfaces that are not covered by the insulative coat,
the spaced apart portions of the insulative coat and the facing surfaces of the anode active material particles that are not covered by the insulative coat provide one or more migration paths for an electrode reactant to the active material layer between the space apart portions, and
the insulative coat comprises a material having a specific heat at 300° Kelvin of 1.7 J/K·g or more.

10. The battery according to claim 9, wherein the insulative coat is in the form of a plate.

11. The battery according to claim 9, wherein the plurality of anode active material particles contain silicon.

12. The battery according to claim 9, wherein where an area of the anode active material layer is S1 and an area of the coat is S2, and an area ratio S2/S1 is in a range from 0.2 to 0.9, inclusive.

13. The battery according to claim 9, wherein a weight per unit area of the coat is in a range from 0.02 mg/cm$^2$ to 1 mg/cm$^2$, inclusive.

14. The battery according to claim 9, wherein the active material layer comprises a plurality of layers.

15. The battery according to claim 9, wherein the insulative coat extends along surfaces of two or more of the anode active material particles.

16. The battery according to claim 9, wherein the insulative coat comprises at least one of a metal hydroxide or a metal oxide.

17. The battery according to claim 9, wherein the insulative coat is at least one selected from the group consisting of aluminum hydroxide, zirconium hydroxide, titanium hydroxide, aluminum oxide, zirconium oxide, and titanium oxide.

18. The battery according to claim 9, wherein the active material layer comprises a carbon material.

\* \* \* \* \*